United States Patent
Elks et al.

[15] 3,665,021
[45] May 23, 1972

[54] 9α-UNSUBSTITUTED-11β-CHLORO-L9 NOS-STEROIDS

[72] Inventors: Joseph Elks, London; Gordon Hanley Phillipps, Greenford; Alan Tulley, Formby, all of England

[73] Assignee: Glaxo Laboratories Limited, Greenford, England

[22] Filed: Aug. 1, 1969

[21] Appl. No.: 846,975

Related U.S. Application Data

[63] Continuation-in-part of Ser. No. 701,064, Jan. 29, 1968, abandoned.

[52] U.S. Cl. ............... 260/397.45, 260/239.5, 260/239.55, 260/239.55 C, 260/397.3, 260/397.45, 260/397.5
[51] Int. Cl. ........................................ C07c 169/32
[58] Field of Search ................................. 260/397.45

Primary Examiner—Elbert L. Roberts
Attorney—Bacon & Thomas

[57] ABSTRACT

9α-Unsubstituted 11β-chloro-19-nor-steroids are provided as new compounds having hormonal activity and, in particular, progesterone-like or anabolic/androgenic activity.

34 Claims, No Drawings

9α-UNSUBSTITUTED-11β-CHLORO-L9 NOS-STEROIDS

This application is a continuation-in-part of Application Ser. No. 701,064 filed Jan. 29, 1968 now abandoned.

The present invention relates to novel chlorine-substituted steroids and to a process for their preparation.

We have found that 9α-unsubstituted 11β-chloro-19-nor-steroids, which are a new class of compounds, possess valuable hormonal activity, for example both orally and parenterally, progesterone-like activity or anabolic activity.

According to the present invention therefore we provide 9α-unsubstituted-11β-chloro-19-nor-steroids.

The new steroids according to the invention may carry various ring substituents, for example in the 17-position a hydroxyl group, a protected hydroxyl group, an oxo group, or a protected oxo group, or an aliphatic, araliphatic, acyl or acyloxyacyl group in the presence or absence of a hydroxyl or protected hydroxyl group; in the ,6-position a methyl, methylene or methoxy group; in the 6-position a chlorine or fluorine atom or a methyl group; in the 3-position an oxo, protected oxo, hydroxyl or protected hydroxyl group. The carbon atoms in the 16- and 17-positions may carry an epoxide or methylene group or form part of a 1'-pyrozolino-(4'3':16α, 17α)-grouping or a 2'-pyrazolino-(4', 5':16α,17α) grouping. The steroids may possess double bonds; for example, the A-ring may be fully aromatic or may possess double bonds in the 1,2-position and/or the 4,5-position. The B-ring may also be unsaturated, for example with a double bond in the 5,6- or 6,7- position. The D ring may possess a double bond in the 16,17-position. In general the 4- position is preferably unsubstituted and the A,B and C rings are preferably not condensed with further rings.

There may thus be an aliphatic acyl group at the 17β-position preferably having two to eight carbon atom which may carry substituents such as acyloxy groups. The most preferred 17β-grouping is the acetyl group as in the 20-oxo-pregnane series.

Where acyloxy groups are present these may be substituted or unsubstituted aliphatic, cycloaliphatic, araliphatic, preferably having one to five carbon atoms in the aliphatic portion, or aryl acyloxy groups, the aryl groups preferably being monocyclic, for example acetoxy, propionyloxy, valeryloxy, hexahydrobenzoyloxy, β-phenylpropionyloxy or benzoyloxy groups.

Other protected hydroxyl groups include ethers, e.g. alkoxy groups having one to five carbon atoms, or aralkoxy or aryloxy groups, especially arylmethoxy groups such as benzyloxy groups. Protected oxo groups include ketal groups, e.g. ethylene-dioxy groups and enol ether groups such as enol methyl ether groups or enol ethyl ether groups.

The aliphatic groups which may be present in the 17-position preferably contain one to nine carbon atoms and may, for example, be substituted or contain unsaturation. Substituents which may be present include for example, halogen atoms (e.g. chlorine) or hydroxy or acyloxy groups. Useful aliphatic substituents thus include methyl, ethyl, propyl, vinyl, 2-methyl-prop-2-enyl, 1-methyl-prop-2-enyl, but-2-enyl, allyl, ethynyl, chlorethynyl groups etc.

Particularly useful steroids according to the invention include steroids having a 3-oxo group and a 4,5-double bond or double bonds in both the 4,5 and 6,7-positions or a 3-acyloxy or 3-ether group and double bonds in the 3,4- and 5,6-positions. Of these, one class of steroids possesses anabolic/androgenic activity, namely those compounds possessing a 17-oxo-group or a 17β-hydroxy or acyloxy group with a 17α-hydrogen atom or saturated hydrocarbon group.

The remaining compounds, and in particular those possessing a 17β-hydroxy or acyloxy group, together with a 17α-unsaturated hydrocarbon substituent, or possessing a 17β-acyl substituent together with a 17α-hydrogen atom or a 17-hydroxy or acyloxy group, possess progesterone like activity. The term progesterone-like activity refers to those activities exhibited by progesterone, for example progestational and antioestrogenic activity. The balance between these two latter activities will again vary with substitution and, for example, the 16-methylene compounds are found generally to possess particularly marked progesterone-like activity, both of the progestational and antioestrogenic type, while the 16,17-methylene compounds are found to possess especially useful antioestrogenic activity.

The 17α-acyloxy compounds possess particularly good oral progestational activity while the compounds not possessing a 17α-acyloxy group tend to be more useful as antioestrogenics.

11β-Chloro-oestr-4-ene-3,17-dione, while possessing hormonal activity, is especially useful as an intermediate in the preparation of related compounds having other substituents in the 3- and/or 17-positions.

Further particularly interesting compounds include 17α-acetoxy-11β-chloro-19-nor-pregn-4-ene-3,20-dione; 11β-chloro-19-nor-pregn-4-ene-3,20-dione; 17α-acetoxy-3-ethoxy-6,11 β-dichloro-19-nor-pregn-3,5-dien-20-one; 17α-acetoxy-6,11β-dichloro-19 nor-pregna-4,6-diene-3,20-dione; 17α-acetoxy-6α,11β-dichloro-19-nor-pregn-4-ene-3,20-dione; 11β-chloro-3-ethoxy-17α-ethynyloestra-3,5-dien-17β-ol; 11β-chloro-17α-ethynyl-17β-hydroxy-3-methoxyoestra-3,5-diene; 17α-ethynyl, 17α-allyl-, 17α(2methyl-prop-2-enyl)-, 17α(12 enyl)- and 17α-but-2-enyl-11β-chloro-17β-hydroxy-oestr-4-en-3-one; 11β-chloro-17α-ethynyl-17β-hydroxy-oestra-4,6-dien-3-one; 6,11β-dichloro-17α-ethynyl-17β-hydroxyoestra-4,6-dien-3-one; 6α,11β-dichloro-17α-ethynyl-17β-hydroxyoestr-4-en-3-one; 3,17α-diacetoxy-11β-chloro-19-nor-pregna-3,5-dien-20-one; 17α -propionyloxy-11β-chloro-19-nor-pregn-4-ene-3,20-dione; 17α-acetoxy-11 β-chloro-19-nor-pregna-4,6-diene-3, 20dione; 11β-chloro-19-norpregna-4,16-diene-3-,20-dione; 11β-chloro-16α-methoxy-19-norpregn-4-ene-3,20-dione; 11β-chloro-1'-pyrazolino-(4',3';16α17α)-19-nor-pregn-4-ene-3,20-dione; 11β-chloro-2'-pyrazolino-(4',5':16α,17α19-nor-pregn-4-ene-3,20-dione; 11α-chloro-16-methyl-19-norpregna-4,16-diene-3,20-dione; 11β-chloro-17α-hydroxy-16-methylene-19-norpregn-4-ene-3,20-dione; 11β-chloro-17αchloroethynyl 17β-hydroxy-oestr-4-en-3-one; 6,11β-dichloro-3-ethoxy-17α-ethynyl-17β-hydroxy-oestr-3,5-diene. 11β-chloro-16α,17α-epoxy-16β-methyl-19-norpregn-4-ene-3,20-dione; 17α-acetoxy-11β-chloro-16-methylene-19-norpregn-4-ene-3,20-dione; 11β-chloro-16α,17α-methylene-19-norpregn-4-ene-3,20-dione; 11β-chloro-16-methylene-17α-propionyloxy-19-norpregn-4-ene-3,20-dione; 3,17α-diacetoxy-11β-chloro-16 -methylene-19-norpregna-3,5-dien-20-one; 17α-acetoxy-6,11β-dichloro-16-methylene-19-norpregna-4,6-diene-3,20-dione; 6,11β-dichloro-16α,17α-methylene-19-norpregna-4,6-diene-3,20-dione The new steroids according to the invention may be prepared in any convenient way. According to a still further feature of the invention there is provided a process for the preparation of 9α-unsubstituted 11β-chloro-19-nor-steroids in which a 9α-unsubstituted 11α-hydroxy-19-nor-steroid is reacted with a reagent of the general formula

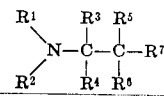

I where R¹ and R², which may be the same or different, are alkyl groups having one to five carbon atoms or aralkyl or aryl groups or, together with the nitrogen atom to which they are attached, comprise a heterocyclic radical which may, if desired, contain further hetero-atoms, R³ is a chlorine or fluorine atom, R⁴ is a chlorine or fluorine atom and R⁵ is hydrogen or R⁴ and R⁵ together represent a carbon-carbon bond;

R⁶ is a chlorine or fluorine atom and

R⁷ is a chlorine or fluorine atom or a trifluoromethyl group, the reaction being effected in the presence of chloride ions when neither R³ nor R⁴ is chlorine.

Where R³ and/or R⁴ are chlorine, the compound of formula I acts directly as a chlorinating agent but where neither R³ nor $R^4$ is chlorine, it is necessary to carry out the reaction in the presence of chloride ions. While it is not wished to be bound by theoretical considerations it is believed that the reagent of formula I reacts with the 11α-hydroxy group to form an intermediate ether with liberation of $HR^3$ or $HR^4$, whereupon the resultant nucleophilic ions $R^{3-}$ or $R^{4-}$ attach the ether grouping to split off the residue of the reagent I and introduce halogen at the 11-position. The chloride ion is more strongly nucleophilic than the fluoride ion so that even when neither $R^3$ nor $R^4$ is chlorine, reaction in the presence of chloride ions results in the introduction of chlorine at the 11-position.

The reaction according to the invention is particularly useful because no methods have previously been described for the preparation of 11β-chloro-steroids with a 9β-hydrogen atom and the method previously proposed for production of the analogous 11β-fluoro-steroids in the 10-methyl series having a 9α-hydrogen atom tends to give the 9,11 unsaturated product.

The source of chloride ions in the variation of the reaction in which neither $R^3$ nor $R^4$ is chlorine is preferably a salt soluble in organic solvents but the cationic portion should be inert to the reagent of formula I for example, the cation of a tertiary or quaternary nitrogen base, e.g. triethylamine, trimethylamine, pyridine, collidine, tetrabutyl ammonium hydroxide etc. In general, however the preferred source of chloride ions is lithium chloride.

The reagents of formula I in which neither $R^3$ nor $R^4$ is chlorine include N-(2-chloro-1,1,2-trifluoroethyl) diethylamine, N-(1,1,2,2-tetrafluoroethyl)diethylamine, N-(2-chloro-1,1,2-trifluoroethyl)dimethylamine, N-(2-chloro-1,1,2-trifluoroethyl)dipropylamine, N-(2-chloro-1,1,2-trifluoroethyl)diisobutylamine, N-(2-chloro-1,1,2trifluoroethyl) dioctylamine, N-(2-chloro-1,1,2-trifluoroethyl)methylethylamine, N-(2,2-dichloro-1,1-difluoroethyl) diethylamine, N-(1,1,2,3,3,3-hexafluoropropyl)diethylamine and N-(1,1,2,2-tetrafluoroethyl) diisopropylamine. The reagent of choice is N-(2-chloro-1,1,2-trifluoroethyl)-diethylamine.

Reagents of formula I in which one or both of $R^3$ and $R^4$ are chlorine include, in particular, N,N-diethyl-trichlorovinylamine.

The reaction is preferably effected in an inert solvent that is any solvent which does not react with the reagent of formula I, for example aromatic and aliphatic hydrocarbons, halogenated hydrocarbons, esters, ketones, nitriles, ethers and tertiary alcohols. Examples of such solvents are benzene, toluene, chlorobenzene, methylene chloride, pentane, hexane, cyclohexane, ethyl acetate, butyl acetate, acetonitrile, acetone, methyl ethyl ketone, tetrahydrofuran, diethyl ether, diethylene glycol dimethyl ether, t-butyl alcohol, t-amyl alcohol, and the like. Since the starting materials are frequently only slightly soluble in non-polar solvents, a polar solvent such as tetrahydrofuran is preferred.

Unless further chlorine substituents are required, reactive hydroxyl groups initially present in the steroid should be protected, for example by esterification, etherification etc.

The 11β-chloro-19-nor-steroids according to the invention can also be prepared by reacting the corresponding 11α-arylsulphonate or 11α-alkylsulphonate with a source of chloride ions, for example a chloride of an alkali metal e.g. lithium chloride, or a hydrochloride of a tertiary organic base such as triethylamine or a chloride of a quaternary organic base such as tetrabutyl ammonium chloride advantageously in an inert polar solvent such as tetrahydrofuran. The above 11α-sulphonates may be prepared by reacting the corresponding 11α-hydroxy compound with an alkyl- or aryl-sulphonyl halide.

The 11β-chloro-19-nor-steroids according to the invention may also be prepared by reaction of a 9α-unsubstituted-11α-hydroxy-19-nor-steroid with a triaryl-phosphine or -phosphite and chlorine or a chloroalkane, for example, triphenylphosphine in carbon tetrachloride.

Particularly preferred starting compounds are the 11α-hydroxy-3-oxo-Δ⁴-19-nor-steroids; of these 11α-hydroxy-oestr-4-ene-3,17-dione, is of especial interest in view of the importance of the corresponding 11β-chloro-compound.

The 9α-unsubstituted-11α-hydroxy-19-nor-steroids may be prepared in any convenient way. Thus, for example, the 11α-hydroxy group may be introduced into a 19-nor-steroid having no 11-substituent by microbiological methods e.g. using organisms such as *Aspergillus ochraceus* and *Rhizopus nigricans*.

The preferred method of preparing the 11α-hydroxy steroids used as starting compounds is to react a 9-dehydro-steroid with diborane followed by reaction of the boron complex so formed with, for example, alkaline hydrogen peroxide as described in our published Dutch Pat. Specification No. 6,611,525.

The reactions according to the invention and a number of subsequent reactions designed to produce various groupings into the steroid molecule are shown in the following drawings:

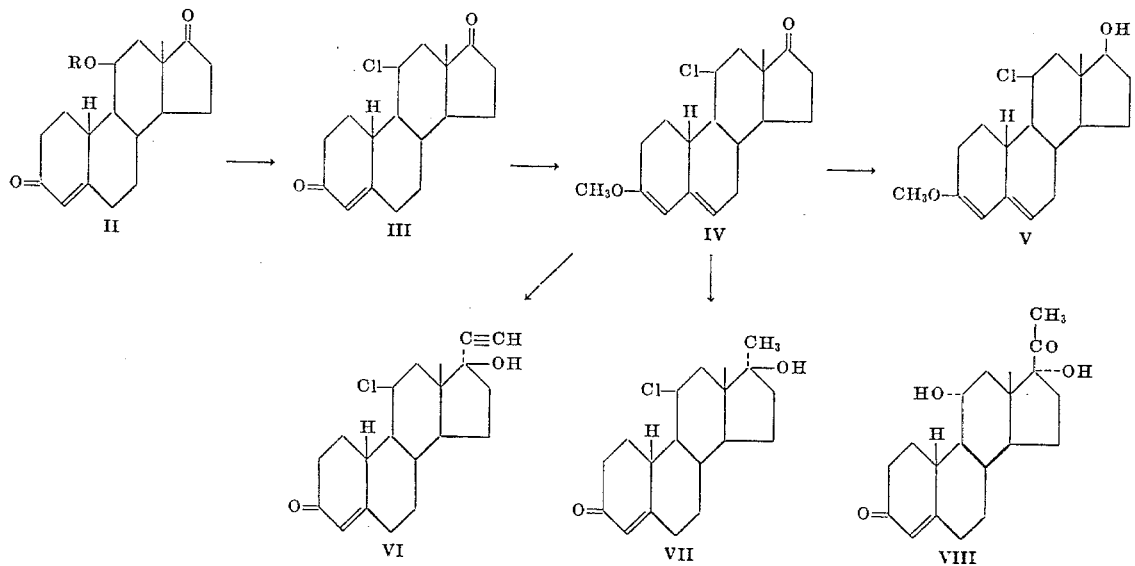

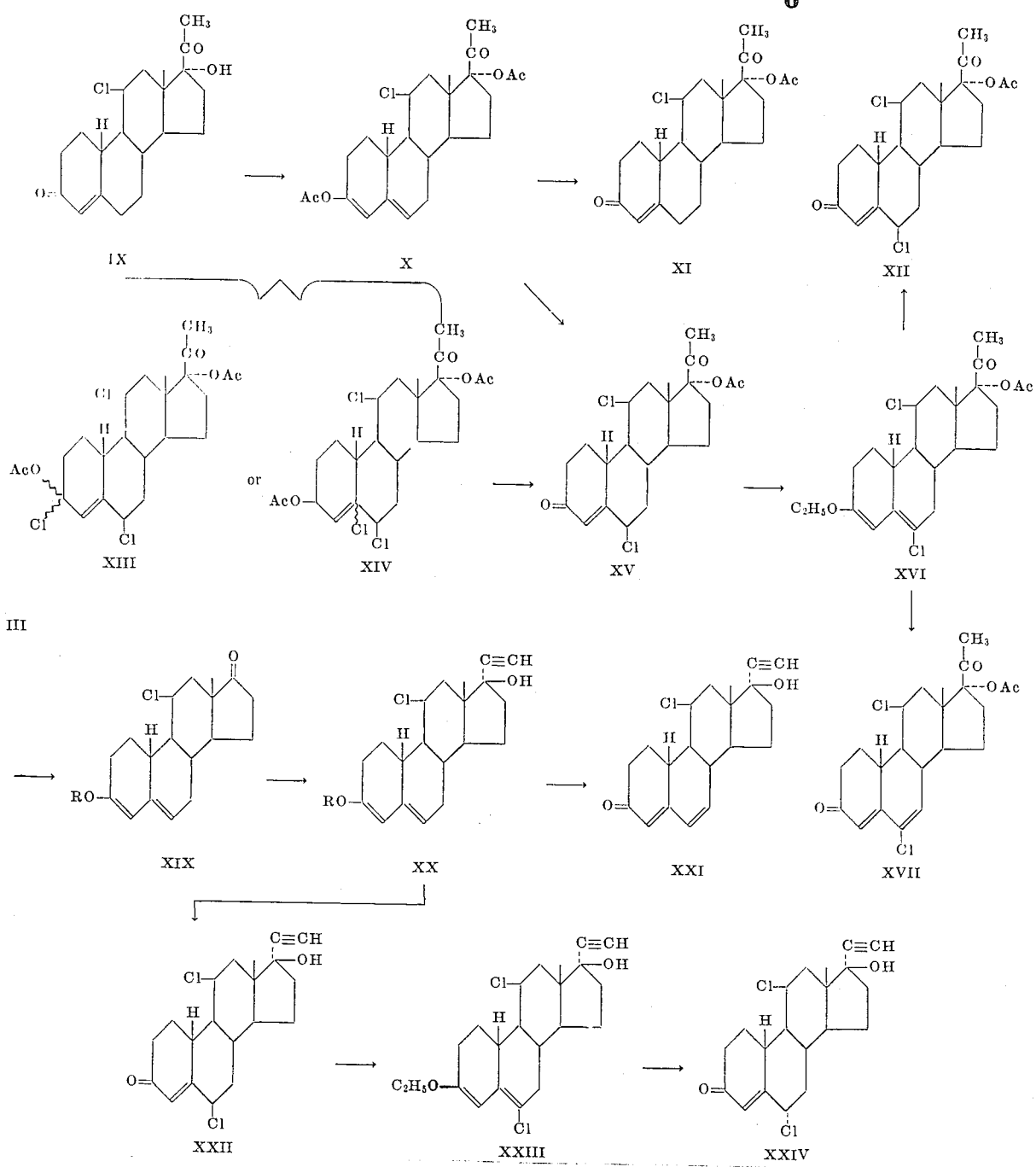

The 11α,17α-dihydroxy-19-norpregn-4-ene-3,20-dione VIII used as starting material may be prepared from the relatively readily available 21-iodo-prednisolone by reduction e.g. with a sulphite reducing agent, to 11β,17α-dihydroxypregna-1,4-diene-3,20-dione which may then be converted, by treatment with an N-halo-amide or N-haloimide, e.g. N-bromosuccinimide or N-chlorosuccinimide, in the presence of a tertiary organic base such as pyridine, quinoline etc. followed by treatment with sulphur dioxide to yield 17α-hydroxy-pregna-1,4,9-triene-3,20-dione which is then aromatized, for example, by reaction with activated zinc in wet pyridine, to 3,17α-dihydroxy-19-norpregna-1,3,5,(10),9-tetraen-20-one which is reacted with an alkylating agent, e.g. an alkyl halide or dialkyl sulphate such as ethyl iodide or dimethyl sulphate to form the corresponding 3-alkoxy derivative (e.g. the 3-methoxy compound) which is then reacted with a ketone protecting reagent, for example a glycol e.g. ethylene glycol, to protect the 20-keto group followed by reaction with diborane and subsequent treatment with alkaline hydrogen peroxide to form the corresponding 11α-hydroxy compound which may then be reduced and hydrolyzed, e.g. by reaction with a metal/ammonia reducing agent, such as lithium in liquid ammonia, in the presence of a proton-source, such as an alcohol, followed by acid hydrolysis to form the desired product VIII.

As shown in the above drawings, 11α-hydroxy-oestr-4-en-3,17-dione (II, R = H) may be reacted with a reagent of formula I according to the process of the invention or with triphenyl phosphine in carbon tetrachloride, to give 11β-chloro-oestr-4-ene-3,17-dione III. Alternatively, the mesylate (II, R = CH$_3$SO$_2$—) may be reacted with a source of chloride ions.

Δ$^4$-11β-Chloro-19-nor-steroid-3,17-diones such as compound III can be treated further to introduce various groupings at the 17-position, where necessary after selective protection of the 3-oxo-group. Thus, for example it is possible to convert to the corresponding 3-enol ether, for example compound IV, e.g. by reaction with an enol-etherifying agent such as a gem-dialkoxy-alkane e.g. 2,2-dimethoxypropane or an alkyl orthoformate, e.g. methyl or ethyl orthoformate, in the presence of acid, e.g. a mineral acid such as hydrochloric or sulphuric acid or an organic acid such as toluene-p-sulphonic acid or benzene sulphonic acid. The double bonds in the enol ether are in the 3 and 5(6)-positions. Other methods of protecting the 3-oxo-group include formation of a ketal or thioketal such as an ethylene, propylene or butylene ketal or thioketal or a hydrazone such as a semicarbazone, phenylhydrazone etc. The nature of the protecting system will clearly be chosen having regard to the subsequent reactions which are to be effected.

The 3-enol ethers may then, for example, be reduced e.g. with a borohydride reducing agent, such as an alkali metal borohydride e.g. sodium, potassium or lithium borohydride, to convert the 17-oxo group to hydroxyl, as in compound V. The 17-hydroxy-3-enol ether can then be converted to the corresponding 3-oxo-$\Delta^4$-steroid by hydrolysis e.g. with a mineral acid such as hydrochloric, hydrobromic or sulphuric acid. If desired, the 17-hydroxy group can be acylated before or after hydrolysis of the enol ether grouping e.g. with an acylating reagent such as an acyl halide or anhydride, for example acetic or propionic anhydride or acetyl or propionyl chloride or bromide.

The 17-oxo-3-enol ethers can also be reacted with organometallic reagents to introduce a 17$\alpha$-hydrocarbon substituent together with a 17$\beta$-hydroxy group. Thus, for example, an acetylide, e.g., an alkali metal acetylide, such as sodium or potassium acetylide, may be used to give the extremely useful 17$\alpha$-ethynyl-17$\beta$-hydroxy derivative, for example compound VI or reaction with a Grignard reagent, e.g., an aliphatic magnesium chloride, bromide or iodide, may be used to give the 17$\alpha$-aliphatic-17$\beta$-hydroxy-compound e.g., a 17$\alpha$-methyl derivative such as compound VII or the corresponding 17$\alpha$-alkyl, 2-methyl-prop-2enyl, 1-methyl-prop-2-enyl or but-2-enyl compounds. Again the 17-hydroxy group can, if desired, be acylated before or after hydrolysis of the enol ether grouping.

The 3-oxo steroids can be converted into the corresponding enol esters by reaction with an acylating agent, such as an anhydride e.g., acetic or propionic anhydride, in the presence of an acid e.g., perchloric acid, toluene-p-sulphonic acid or sulphosalicylic acid. The reaction may be effected in an inert organic solvent, e.g., a hydrocarbon, halogenated hydrocarbon or ester solvent, or an excess of the anhydride may be used as solvent. This reaction, as applied to 3-oxo-$\Delta^4$-steroids, leads to the corresponding 3-acyloxy-$\Delta^{3,5}$-steroids. Where there is a free hydroxyl group present, e.g., at the 17-position, this may be acylated simultaneously.

If desired, the 3-oxo and/or 17-oxo group can be reduced to hydroxyl, for example using a borohydride reducing agent, e.g., sodium, potassium or lithium borohydride, and acylation using an appropriate acyl anhydride or halide will yield the corresponding 3- and/or 17-acyloxy derivative, for example the acetate or benzoate. The borohydride reduction can be carried out in the presence of a conjugated double bond and, for example, $\Delta^4$-3-ketones can be reduced in this way.

Where it is desired to produce the 3- and/or 17-acyloxy compounds according to the invention or the corresponding 3- and/or 17- ethers, these can be prepared by reaction of the corresponding 3- and/or 17- hydroxy steroids or 3-oxosteroids with an acylating agent for example an acyl halide or anhydride, e.g., acetic, propionic or benzoic anhydride or chloride, or an etherifying agent for example an alkyl or aralkyl halide, sulphate or arylsulphonate. 3-Oxo steroids will, of course, form the corresponding enol or dienol ethers or esters as indicated above.

The 6$\beta$-chloro-3-oxo-$\Delta^4$-steroids according to the invention are of particular importance. They can be prepared by reaction of a 3-acyloxy or 3-alkoxy-$\Delta^{3,5}$-11$\beta$-chloro-19-nor-steroid with a chlorinating agent such as molecular chlorine preferably in the presence of a carboxylic acid such as acetic, propionic or pivalic acid and a tertiary base such as trimethylamine, triethylamine or pyridine, or with an N-chloro-amide or -imide e.g., N-chlorosuccinimide, or N-chloroacetamide, preferably in the presence of an inorganic or organic base, e.g., an alkali metal acetate such as sodium or potassium acetate or a tertiary amine such as triethylamine, trimethylamine or pyridine in the presence of a carboxylic acid such as acetic, propionic or pivalic acid. The 3-acyloxy group may, for example, be a 3-benzoyloxy or 3-acetoxy group, and the 3-alkoxy group may, for example, be a methoxy or ethoxy group.

The 6$\alpha$-chloro-3-oxo-$\Delta^4$-steroids according to the invention are also of particular interest and these can be obtained from the corresponding 6$\beta$-chloro-steroids by converting to the enol ethers or esters, e.g., using the methods described above, followed by hydrolysis, e.g., acid hydrolysis, for example using a mineral acid such as hydrochloric, hydrobromic or sulphuric acid or an organic acid such as acetic, propionic or toluene-p-sulphonic acid, to remove the 3-ether or ester group.

3-Oxo-$\Delta^{4,6}$-steroids according to the invention can be prepared by reaction of a corresponding 3-acyloxy or 3-alkoxy-$\Delta^{3,5}$-steroid with a reagent capable of converting an enol ether or ester into a conjugated ketone, for example chloranil or manganese dioxide.

17$\alpha$-Acyloxy-3-keto-$\Delta^4$-steroids according to the invention may be obtained from the corresponding 3$\beta$,17$\alpha$-diacyloxy-$\Delta^{3,5}$-steroids by selective hydrolysis at the 3-position e.g., using a basic reagent such as an alkali metal hydroxide, e.g., sodium or potassium hydroxide, or an acidic reagent, e.g., an organic or mineral acid preferably in a polar solvent medium such as methanol, ethanol, dioxan, tetrahydrofuran etc.

Alternatively the 17-hydroxy-3-keto-$\Delta^4$-steroids according to the invention can be converted into the 17-acyloxy-3-keto-$\Delta^4$-steroids without attack at the 3-position by reaction with the adduct of antimony pentachloride and the appropriate acyl halide under non-hydroxylic conditions.

17-acyl-$\Delta^{16}$- steroids according to the invention may be prepared from the corresponding 17$\beta$-acyl-17$\alpha$-hydroxy steroids by reaction with semicarbazide followed by cleavage e.g., by reaction of the resulting product with pyruvic acid. A 3-keto-$\Delta^4$-system will not be changed by this reaction sequence. This reaction does, however, also produce the 16$\alpha$-methoxy-17$\beta$-acyl compounds when methanol is used as solvent. The two types of compound may be separated by conventional methods, for example preparative thin layer chromatography, the 16$\alpha$-methoxy compound being in the more polar fractions.

The 16$\alpha$,17$\alpha$-pyrazolino-17$\beta$-acyl compounds according to the invention may be prepared from the above 17 -acyl $\Delta^{16}$-compounds by reaction with diazomethane in an inert solvent, for example a mixture of ether and methylene chloride. The reaction is selective in the presence of the 3-keto-$\Delta^4$-system. The reaction gives the 1'-pyrazolino-(4',3':16$\alpha$,17$\alpha$-)-17$\beta$-acyl compound, often in admixture with the isomeric 2'-pyrazolino-(4',5':16$\alpha$,17$\alpha$)-17$\beta$-acyl compound; the two products may be separated by conventional methods e.g., preparative thin layer chromatography, the 1'-pyrazolino-(4',3':16$\alpha$¼,17$\alpha$)-compound being in the less polar fractions.

The 16-methyl-17 -acyl-$\Delta^{16}$-compounds according to the invention may be prepared from the 17$\beta$-acyl-1'-pyrazolino-(4',3':16$\alpha$,17)-compounds by pyrolysis e.g., in a high boiling non-acidic medium at temperatures of the order of 120° to 220° C. High boiling petroleum fractions such as Nujol are suitable media; dimethyl formamide and ethylene glycol have also been used.

The 16-methyl-17-acyl-$\Delta^{16}$-compounds may also be prepared by reaction of the corresponding 11$\alpha$-hydroxy compounds with a reagent of formula I by the process according to the invention. The 11$\alpha$-hydroxy-16-methyl -17-acyl-$\Delta^{16}$- steroid used as starting material may be prepared conveniently by pyrolysis of the corresponding 11$\alpha$-hydroxy-17$\beta$-acyl-1'-pyrazolino-(4',3':16$\alpha$,17$\alpha$)-steroids as described above for 11$\beta$-chloro compounds. The starting pyrazolino-steroids may be prepared by reaction of the corresponding 17-acyl-$\Delta^{16}$- steroids with diazomethane. The 11α-hydroxy-17-acyl-Δ¹⁶-steroids may be prepared as described above for the corresponding 11α-chloro-compounds, by reaction of 17β-acyl-17α-hydroxy steroids with semicarbazide to form a semicarbazone which is then cleaved, e.g., with pyruvic acid. As indicated above, 16α-methoxy-17β-acyl-compounds may be formed in this reaction but can readily be separated by such techniques as preparative thin layer chromatography.

16-Methyl-17-acyl-16α,17α-epoxy steroids according to the invention may be prepared by reaction of the 11β-chloro-16-methyl-17-acyl-Δ¹⁶-steroids described above by reaction with a per-acid e.g., perbenzoic, m-chloroperbenzoic or monoperphthalic acid or, more preferably, peroxytrifluoroacetic acid. This reaction may not be completely selective in the presence of a Δ⁴-3-ketone and in such cases a 4-oxa-A-homo-4 a-en-3-one may be formed as a by-product.

The 16-methylene-17β-acyl-17α-hydroxy steroids according to the invention may be prepared from the above 16α,17α-epoxides by reaction with acid. The reaction proceeds readily and is preferably effected in a non-hydroxylic medium of low ionizing power such as an anhydrous cyclic or acyclic ether, e.g., dioxan, tetrahydrofuran, diethyl ether or diisopropyl ether. The acid is preferably a strong acid, e.g., a mineral acid such as hydrogen bromide, hydrogen chloride, sulphuric acid or perchloric acid or a strong organic acid such as formic acid. A lower aliphatic acid such as acetic or propionic acid can conveniently be present with a mineral acid and HBr and acetic acid in dioxan is a preferred acid medium.

17-Esters of the above 16-methylene-17β-acyl-17α-hydroxy steroids may conveniently be prepared directly from the above 16α, 17αepoxides by reaction with an acyl anhydride under acid conditions. The reaction may be effected selectively in the presence of the 3-oxo-Δ⁴ - grouping without enol esterification. For formation of 17α-lower acyloxy compounds, above 16α, 17α-, the epoxide may, for example, be reacted with trifluoro-acetic anhydride in the appropriate acid for example a lower aliphatic acid such as glacial acetic acid or propionic acid whereby the mixed anhydride of the acid and trifluoro-acetic acid is generated and reacts preferentially.

Alternatively, the 17hydroxy-16-methylene compounds can be esterified using, for example, an acyl anhydride under acidic conditions e.g., acetic anhydride and acetic acid in the presence of p-toluene sulphonic acid as catalyst or the above described mixture of trifluoroacetic anhydride and aliphatic acid to furnish the corresponding 17-ester.

There is now given the preferred method of preparation of a number of particularly important compounds according to the invention.

The compound 11β-chloro-17α-ethynyl-17β-hydroxy-3-methoxy-oestra-3,5-diene XX (R = CH₃) may conveniently be prepared by reaction of 11β-chloro-3-,ethoxy-oestra-3,5-dien-17-one XIX (R = CH₃) with an acetylide, e.g., an alkali metal acetylide such as sodium or potassium acetylide. Sodium acetylide is preferably used in liquid ammonia as solvent, conveniently together with a co-solvent, for example, diethyl ether, dioxan or tetrahydrofuran. This compound is also of use as an intermediate in preparing 11β-chloro-17α-ethynyl-17β-hydroxyoestr-4-en-3-one.

11β-Chloro-17α-ethynyl-3-ethoxyoestra-3,5-dien-17β-ol XX (R = C₂H₅) may be prepared by a method analogous to that described above for the corresponding 3-methoxy compound by reaction of 11β-chloro-3-ethoxyoestr-3,5-dien-17-one XIX (R = C₂H₅) with an acetylide. The starting material may be prepared by reacting 11β-chloro-oestr-4-en-3,17-dione III with an ethylating agent e.g., a transetherification agent such as ethyl orthoformate in the presence of an acid catalyst e.g., a mineral acid such as hydrochloric or sulphuric acid or an organic acid such as toluene-p-sulphonic acid or sulphosalicylic acid.

6β,11β-Dichloro-17α-ethynyl-17β-hydroxyoestr-4-en-3-one XXII may be prepared by reaction of a corresponding 3-alkoxy-3,5-diene with a chlorinating agent such as an N-chloro-amide or -imide, e.g., N-chlorosuccinimide as described above. The 3-alkoxy group may, for example, be a methoxy or ethoxy group.

A 6β-chloro-4-en-3-one can be converted into the corresponding 6α-chloro compound by enol alkylation, e.g., etherification using an alkyl orthoformate and acid,or enol esterification, e.g., using an acid anhydride and an acid catalyst followed by hydrolysis of the resulting 6-chloro-3,5-diene, e.g., in an acid medium. The acid may be an organic acid, e.g., acetic or propionic acid, or a mineral acid, e.g., hydrochloric acid. The conditions may be mild and standing at room temperature in acetic acid is normally effective. Thus, 6α,11β-dichloro-17α-ethynyl-17β-hydroxyoestr-4-en-3-one XXIV may be prepared by reaction of 6β,11β-dichloro-17α-ethynyl-17β-hydroxyoestr-4-en-3-one with an alkyl orthoformate followed by hydrolysis of the resulting 6,11β-dichloro-3,5-diene XXIII with acetic acid.

11β-Chloro-17α-ethynyl-17β-hydroxyoestra-4,6-dien-3-one XXI may be prepared from an 11β-chloro-17α-ethynyl-3-alkoxy or 3-acyloxy oestra-3,5-dien-17β-ol by reaction with a reagent capable of converting an enol ether or ester to a conjugated ketone, e.g., chloranil or manganese dioxide, the latter reagent being preferred where enol esters are to be dehydrogenated.

17α-Acetoxy-11β-chloro-19-norpregn-4-ene-3,20-dione XI may be prepared conveniently by hydrolytic de-acetylation at the 3-position of 3,17α-diacetoxy-11β-chloro-19-norpregna-3,5-dien-20-one, X. The hydrolysis can be effected under acidic or basic conditions e.g., using aqueous mineral acid, for example hydrochloric or sulphuric acid, or an alkali metal hydroxide, preferably in a polar solvent medium such as methanol, ethanol, dioxan, tetrahydrofuran etc.

The 3,17α-diacetoxy-11β-chloro-19-norpregna-3,5-dien-20-one X used as starting material may conveniently be prepared by acetylation of 11β-chloro-17α-hydroxy-19-norpregn-4-ene-3,20-dione IX, e.g., using an acetyl halide or acetic anhydride preferably in the presence of an acid catalyst e.g., a sulphonic acid such as toluene-p-sulphonic or methane-sulphonic acid.

The 11β-chloro-17α-hydroxy-19-norpregn-4-ene-3,20-dione IX starting material is conveniently prepared by reaction of the corresponding 11α-hydroxy compound VIII with a reagent of the general formula I as defined above the reaction being effected in the presence of chloride ions when R³ and R⁴ are both fluorine.

3,17α-Diacetoxy-11β-chloro-19-norpregna-3,5-dien-20-one X may also be used as starting material for the preparation of 6β-chloro-derivatives, which are also of interest in the progestational field, by reaction with a chlorinating agent. Molecular chlorine, preferably in the presence of triethylamine and acetic acid, yields a mixture of the desired dichloro-compound, 17α-acetoxy-6β,11β-dichloro-19-norpregn-4-ene-3,20-dione XV with one or more of the trichloro-compounds, 3ϵ, 17α-diacetoxy-3ϵ, 6β,11β-trichloro-19-norpregn-4-en-20XIII and 3,17α-diacetoxy-5ϵ,6β,11β-trichloro-19-norpregn-3-en-20-one XIV. The trichloro compounds yield the dichloro-compound XV by treatment with acid, e.g., acetic acid.

Compound XV may be converted into the corresponding 3-alkoxy-3,5-diene, e.g., by reaction with an alkyl orthoformate in the presence of an acid catalyst such as toluene-p-sulphonic or sulphosalicylic acid. Thus triethylorthoformate yields 17α-acetoxy-3-ethoxy-6,11β-dichloro-19-norpregna-3,5-dien-20-one XVI. The 3-alkoxy-3,5-diene may then be converted into the corresponding 17α-acetoxy-6,11β-dichloro-19-norpregna-4,6-diene-3,20-dione XVII by dehydrogenation e.g., with chloranil or manganese dioxide.

Compound XVI may be converted into 17α-acetoxy-6α, 11β-dichloro-19-norpregn-4-ene-3,20-dione XII by hydrolysis in an acid medium. The acid may be an organic acid, e.g., acetic or propionic acid, or a mineral acid, e.g., hydrochloric acid. The conditions may be mild and standing at room temperature in acetic acid is normally effective.

The use of reagents of formula I in which neither R³ nor R⁴ is chlorine in the presence of chloride ions for the replacement of a hydroxyl group by chlorine is, to our knowledge, new. According to a further feature of the present invention, therefore, we provide a general process for the preparation of chlorine-substituted steroids in which a steroid alcohol is reacted with a compound of general formula I (in which $R^1$, $R^2$, $R^5$, $R^6$ and $R^7$ have the above meanings, $R^3$ is fluorine and $R^4$ is fluorine or together with $R^5$ forms a carbon-carbon bond) in the presence of chloride ions. The source of chloride ions and other reaction conditions are preferably those particularized above for reaction with 11α-hydroxy-19-nor-steroids. The reaction may be applied to replacement of hydroxyl by chlorine in a variety of steroid alcohols and thus, for example, 3α-chloro-5αcholestane may be obtained from cholestan-3β-ol in this way.

According to a still further feature of the invention we provide pharmaceutical compositions comprising one or more 9α-unsubstituted-11β-chloro-19-nor-steroids together with a pharmaceutical carrier or excipient and/or one or more further active compounds e.g., hormones. Compounds having progestational activity may advantageously be formulated in conjunction with one or more hormones having oestrogenic activity.

The compositions according to the invention are intended for administration to both humans and animals. The term "pharmaceutical" as used herein to describe compositions and carriers means therefore that these are of use in both human and veterinary medicine.

The compositions are preferably in the form of dosage units and may be formulated for daily oral administration in such forms as tablets, capsules, sachets etc., either for taking directly or with a draught. Suppositories for rectal absorption may also be employed. Injection preparations may be formulated, preferably for more prolonged action, while implantation pellets may be formulated having the advantage of requiring very infrequent administration.

Conventional pharmaceutical excipients for solid preparations may for instance include sugar alcohols, sugars, starch, magnesium stearate, gelatine, polyethylene glycols and suitable coloring agents. Tablets may be coated for protection, color distinction or elegance by conventional methods such as film coating or sugar or pearl coating. Suppositories may be prepared, using conventional bases such as glyco-gelatine, cocoabutter, or water-dispersible bases with a melting point above body temperature, such as polyglycols.

For injection purposes, preparations for intramuscular or subcutaneous administration may be prepared in conventional sterile oily, aqueous or emulsion bases, in solution and/or suspension. Vehicles preferably include physiologically acceptable vegetable oils, e.g., arachis oil, fractionated coconut oil; oily esters, e.g., isopropyl-myristate; non-aqueous solvents, e.g., propylene glycol; aqueous vehicles such as sterile water or physiological saline; together with suitable formulatory agents such as suspending agents, e.g., aluminum stearate for oily materials, carboxymethyl cellulose for aqueous preparations; physiologically acceptable emulsifying agents, e.g., "Tween" 81 buffering agents for pH control, anti-oxidants, stabilizing and solubilizing agents. The injections may be formulated for immediate use, or as a dry power for re-constitution before use with a separate vehicle. Unit injections required for prolonged action, e.g., 1 month's duration, would naturally contain an increased quantity of active material.

Each dosage unit for daily administration to humans preferably contains 0.01 to 5.0 mg. active material according to the invention, advantageously 0.05 to 5.0 mg., for example 0.2 to 2.0 mg.

Implantation pellets would in general contain a much higher dosage to cover prolonged activity for preferably several months. Implants may be prepared aseptically from sterile material, by fusion or heavy compression, preferably without the addition of other substances.

For veterinary use in particular, long acting vaginal inserts such as tampons and pessaries may be prepared in a conventional manner. The dosage required for animal treatment will of course, vary according to the size of the animal.

The following compounds according to the invention have given particularly good results in tests demonstrating hormonal activity:

| Compound | No. |
|---|---|
| 17α-Acetoxy-11β-chloro-19-nor-pregn-4-ene-3,20 dione | XI |
| 3,17α-Diacetoxy-11β-chloro-19-nor-pregna-3,5-dien-20-one | X |
| 11β-Chloro-19-nor-pregn-4-ene-3,20-dione | XXV |
| 17α-Acetoxy-3-ethoxy-6,11β-dichloro-19-nor-pregna-3,5-dien-20-one | XVI |
| 17α-Acetoxy-6,11β-dichloro-19-nor-pregna-4,6-diene-3,20-dione | XVII |
| 17α-Acetoxy-6α,11β-dichloro-19-nor-pregn-4-ene-3,20-dione | XII |
| 11β-Chloro-3-ethoxy-17α-ethynyloestra-3,5-dien-17β-ol | XX(R C₂H₅) |
| 11β-Chloro-17α-ethynyl-17β-hydroxy-3-methoxyoestra-3,5-diene | XX(R CH₃) |
| 11β-Chloro-17α-ethynyl-17β-hydroxyoestr-4-en-3-one | VI |
| 6α,11β-Dichloro-17α-ethynyl-17β-hydroxyoestr-4-en-3-one | XXIV |
| 6β,11β-Dichloro-17αethynyl-17β-hydroxyoestr-4-en-3-one | XXII |
| 11β-Chloro-3-ethoxyoestra-3,5-dien-17-one | XIX(R C₂H₅) |
| 11β-Chloro-3-methoxyoestra-3,5-dien-17-one | IV |
| 11β-chloro-oestr-4-ene-3,17-dione | III |
| 11β-Chloro-17α-propionyloxy-19-norpregna-4-ene-3,20-dione | XXVI |
| 17α-Acetoxy-11β-chloro-19-norpregna-4,6-dien-3,20-dione | XXVII |
| 11β-Chloro-16α-methoxy-19-nor-pregn-4-ene-3,20-dione | XXVIII |
| 6,11β-Dichloro-3-ethoxy-17α-ethynyl-17β-hydroxy-oestr-3,5-diene | XXIX |
| 11β-Chloro-17β-hydroxy-17α-(2-methyl-prop-2-enyl)-oestr-4-en-3-one | XXX |
| 11β-Chloro-1'-pyrazolino-(4'3':16α,17α19-nor-pregn-4-ene-3,20-dione. | XXXI |
| 11β-Chloro-17α-chloroethynyl-17β-hydroxyoestr-4-ene-3-one | XXXII |
| 6,11β-Dichloro-17α-ethynyl-17β-hydroxy-oestr-4,6-dien-3-one | XXXIII |
| 11β-Chloro-17α-ethynyl-17β-hydroxy-oestra-4,6-dien-3-one | XXXIV |
| 11β-Chloro-17β-hydroxy-17α-(prop-2-enyl)-oestr-4-en-3-one | XXXV |
| 11β-Chloro-17β-hydroxy-17α-(1-methylprop-2-enyl)-oestr-4-en-3-one. | XXXVI |
| 11β-chloro-16α,17α-epoxy-16β-methyl-19-norpregn-4-ene-3,20-dione; | XXXIX |
| 17α-acetoxy-11β-chloro-16-methylene-19-norpregn-4-ene-3,20-dione; | XLV |
| 11β-chloro-16α,17α-methylene-19-norpregn-4-ene-3,20-dione; | XL |
| 11β-chloro-16-methylene-17α-propionyloxy-19-norpregn-4-ene-3,20-dione; | XLI |
| 3,17α-diacetoxy-11β-chloro-16-methylene-19-norpregna-3,5-dien-20-one; | XLII |
| 17α-acetoxy-6,11β-dichloro-16-methylene-19-norpregna-4,6-diene-3,20-dione; | XLIII |
| 6,11β-dichloro-16α,17α-methylene-19-norpregna-4,6-diene-3,20-dione. | XLIV |

Compounds III, IV and XIX have shown good anabolic/androgenic activity ratios. All the rest of the above compounds possess progesterone-like activity several times greater than that of progesterone. Compounds XI, XVII, XLV, XLI and XLIII have shown exceptional progestational activity and compounds XXV, XXX, XXXII, XLV, XL, XLIV, XLII and XLIII have shown exceptional antioestrogenic activity.

The progestational compounds listed above may be employed as oral contraceptives, preferably either in continuous daily doses of 0.01 to 0.5 mg advantageously 0.05 to 0.5mg. only or given intermittently at higher doses mixed with an oestrogen (0.05 mg. ethynyl oestradiol plus 0.1–5 mg. advantageously 0.5–5mg, for example 0.5–2mg. progestagen). Apart from their use as oral contraceptives these progestagens may be employed clinically in the following conditions; dysmenorrhoea, functional uterine bleeding, pre-menstrual tension, diagnosis of pregnancy, endometriosis and threatened or habitual abortion.

For the better understanding of the invention the following Examples are given by way of illustration only; all temperatures are in °C; unless otherwise stated, optical rotations were determined in chloroform solution at approximately 1 percent w/v concentration and U.V. spectra determined in ethanol:

EXAMPLE 1

Preparation of 11β-chloro-oestr-4-ene-3,17-dione from
a. 11α-hydroxyoestr-4-ene3,17-dione and N,N-diethytrichlorovinylamine 11α-Hydroxyoestr-4-ene-3,17-dione (6 g.), prepared as in Example 3 of our Dutch Pat. Application No. 6,611,525 in tetrahydrofuran (350 ml.) was heated under reflux in an atmosphere of nitrogen with N,N-diethyltrichlorovinylamine (40 ml., 9 mole equivs.). After 24 hr., the solvents were removed in vacuo and the crude product was isolated in chloroform and purified by chromatography on magnesium silicate (350 g.).

Elution with 50 percent ethyl acetate/benzene gave 11β-chloro-oestr-4-ene-3,17-dione (1.58 g., 25 percent) which crystallized as prisms (methanol), m.p. 185°–7°. It had spectral data resembling that of the authentic specimen prepared by the method described below. Addition of lithium chloride (3.6 mole equivs.) to this reaction mixture resulted in a similar reaction to yield 11β-chloro compound.

b. 11α-Hydroxyoestr-4-ene-3,17-dione and N-(2-chloro-1,1,2-trifluoro-ethyl)-diethylamine in presence of lithium chloride A mixture of 11α-hydroxyoestr-4-ene-3,17-dione (5 g.) in tetrahydrofuran (100 ml.) with N-(2-chloro-1,1,2-trifluoroethyl)-diethylamine (10 ml., 3.1 mole equivs.) and anhydrous lithium chloride (25 g., 35 mole equivs.) was heated under reflux (1 hr.). The solvents were evaporated in vacuo and the steroidal product was isolated in chloroform and chromatographed on magnesium silicate (250 g.). Elution with 25 percent ethyl acetate in benzene gave 11β-chloro-oestr-4-ene-3,17 -dione (1.8 g. 34 percent) which crystallized from methanol as prisms, m.p. 188°–189°, $[\alpha]_D$ + 199° (c 0.7 chloroform), λmax, 237 mμ (ε 17,600 ) (Found: C, 70.4; H, 7.7; Cl, 11.5. $C_{18}H_{23}ClO_2$ requires C, 70.5; H, 7.6; Cl, 11.6 percent).

c. 11α-Mesyloxyoestr-4-ene-3,17-dione and lithium chloride

11α-Mesyloxyoestr-4-ene-3,17-dione (0.05 g.) in tetrahydrofuran (5 ml.) was heated under reflux (3 days) with anhydrous lithium chloride (0.25 g.). Evaporation of the solvent in vacuo and isolation of the product in ethyl acetate gave 11β-chloro-oestr-4-ene-3,17-dione which had similar spectral characteristics to the products described above.

EXAMPLE 2

11β-Chloro-3-methoxyoestra-3,5(6)-dien-17-one

A mixture of 11β-chloro-oestr-4-ene-3,17-dione (2.51 g.), 2,2-dimethoxypropane (12.5 ml.), dimethylformamide (12.5 ml.), methanol (0.5 ml.) and toluene p-sulphonic acid (0.077 g.) was heated under reflux for 4 hr. The cooled solution was poured into water containing some sodium hydrogen carbonate and the product, after isolation in ether, was crystallized from methanol containing a little pyridine to give rectangular prisms of 11β-chloro-3-methoxyoestra-3,5(6) -dien-17-one (0.97 g., 37 percent), m.p. 133°–134°, $[\alpha]_D$ + 1° (c 0.8 dioxan). λmax. 241 mμ(ε 19,800). (Found: C, 71.1; H, 7.6; Cl, 11.2. $C_{19}H_{25}ClO_2$ requires C, 71.1; H, 7.9; Cl, 11.1 percent).

EXAMPLE 3

11β-Chloro-3-methoxyoestra-3,5(6) -dien-17β-ol

To 11β-chloro-3-methoxyoestra-3,5(6)-dien-17-one (0.212 g.) in methanol (20 ml.) was added sodium (ca 0.2 g.) followed by sodium borohydride (0.25 g.) and the mixture was heated under reflux (2 hr.). Evaporation of the solvents in vacuo and trituration of the residue with water gave a filterable product which was dried and crystallized from methanol (containing a little pyridine) to give 11β-chloro-3-methoxyoestra-3,5(6)-dien-17β-ol (0.07 g., 33 percent) as rectangular prisms, m.p. 78°–80°; λmax. 240 mμ(ε 17,800). Spectral data accorded with the above structure.

EXAMPLE 4

11β-Chloro-17α-ethynyl-17β-hydroxyoestr-4-en-3-one

A solution of sodium acetylide in liquid ammonia was made by passing acetylene (3 hr.) through a solution of sodamide in liquid ammonia, made from sodium (0.47 g.) dissolved in liquid ammonia (60 ml.), and catalyzed by ferric nitrate (6 mg.). To the solution was added 11β-chloro-3-methoxyoestra-3,5(6)-dien-17-one (0.42 g.) in ether-tetrahydrofuran (1:1, 40 ml.) followed, (after 12 hr.), by ammonium chloride (ca 2 g.). After evaporation of the ammonia and solvents in vacuo, the product was isolated in ethyl acetate and treated with a solution of concentrated hydrochloric acid (0.3 ml.) in water (10 ml.), and methanol (50 ml. ) at the boiling point (1 hr.). Evaporation of the solvents in vacuo and crystallization of the residue twice from ether-acetone gave 11β-chloro-17α-ethynyl-17β-hydroxyoestr-4en-3-one (0.15 g., 33 percent), m.p. 230°–232° (crystal change at 215°), $[\alpha]_D$ + 64° (c 0.6 chloroform). λmax. 239 mμ (ε 16,500). (Found: C, 72.1; H, 7.5: Cl, 10.6. $C_{20}H_{25}ClO_2$ requires C, 72.2; H, 7.6; Cl, 10.7 percent).

EXAMPLE 5

11β-Chloro-17β-hydroxy-17α-methyloestr-4en3-one

11β-Chloro-3-methoxyoestra-3,5(6)-dien-17-one (0.49 g.) in tetrahydrofuran (14 ml.) was added dropwise to a solution of methylmagnesium iodide, made from magnesium (0.58 g.) and methyl iodide (1.5 ml.) in ether (14 ml.). The reaction mixture was heated under reflex for 2 hr., and a saturated solution of ammonium chloride was then added. The product (0.5 g.) was isolated in ether and hydrolyzed in methanol (35 ml.) by a solution of concentrated hydrochloric acid (0.3 ml.) in water (10 ml.). The product was chromatographed on magnesium silicate (100 g.), elution with 5 percent ethyl acetate in benzene giving a crude specimen of 11β-chloro-17β-hydroxy-17α-methyloestr-4-en-3-one which was contaminated with ca. 25 percent of 17-ketonic material as indicated by the infrared spectrum.

EXAMPLE 6

11β-Chloro-17α-ethynyl-17β-hydroxy-3-methoxyoestra-3,5-diene (XX R = $CH_3$)

11β-Chloro-3-methoxyoestra-3,5-dien-17-one XIX (R = $CH_3$) (1.4 g.) in tetrahydrofuran (80 ml.) was added to a solution of lithium acetylide made by passing acetylene (5 hr.), through a solution of lithium aluminum hydride (5 g.) in tetrahydrofuran (250 ml.). After 16 hr. the excess of acetylide was decomposed by a saturated solution of sodium potassium tartrate and the solution was dried over magnesium sulphate. Evaporation of the solvent and crystallization of the residue from isopropanel-water, and then from ether-light petroleum (b.p. 40°–60°) in the presence of a little pyridine, gave 11β-chloro-17α-ethynyl-17β-hydroxy-3-methoxyoestra-3,5-diene XX (R = $CH_3$) (0.107 g., 15 percent), m.p. 131°–133°, λmax. 240 mμ (ε 18,400). (Found: C, 72.4; H, 7.8; Cl, 10.2. $C_{21}H_{27}ClO_2$ requires C, 72.7; H, 7.85; Cl, 10.2percent).

EXAMPLE 7

11β-Chloro-3-ethoxyoestra-3,5-dien-17-one XIX (R = $C_2H_5$

Toluene-p-sulphonic acid (42 mg.) and ethyl orthoformate (3 ml.) were added under nitrogen to 11β-chlorooestr-4-ene 3,17-dione XVIII (3 g.) in dioxan (15 ml.). After 70 min., pyridine (10 drops) was added and the reaction mixture was partitioned between dilute aqueous sodium hydrogen carbonate and ether containing a trace of pyridine. Evaporation of the ether layer to dryness and crystallization of the residue from ether-light petroleum (b.p. 40°–60°) gave 11β-chloro-3-ethoxy-oestra-3,5-dien-17-one (1.8 g.). Recrystallization from ether gave prisms, m.p. 144°–145°, λmax. (in EtOH) 241 nm ($\epsilon$ 20,700).

EXAMPLE 8

11β-Chloro-17α-ethynyl-3-ethoxyoestra-3,5-dien-17β-ol. XX ($R = C_2H_5$)

Sodium (1 g.) was added to liquid ammonia (ca. 200 ml.) containing ferric nitrate (20 mg.) and the solution was stirred for 75 min., and then acetylene was passed through the solution for 2 hr. A solution of 11β-chloro-3-ethoxyoestra-3,5-dien-17-one XIX ($R = C_2H_5$) (2 g.) in tetrahydrofuran (60 ml.) was added and acetylene was passed through the solution for a further 21 hr. during which time the ammonia evaporated.

Ammonium chloride was added, followed by 2N-sodium bicarbonate solution, and the steroid was extracted with ether containing a trace of pyridine. Trituration of the gum with methanol containing a trace of pyridine gave 11β-chloro-17α-ethynyl-3-ethoxyoestra-3,5-dien-17β-ol XX ($R = C_2H_5$) (1.2 g.), m.p. 122°–126°, $[\alpha]_D$ − 102° (c, 0.5 in dioxan); $\lambda_{max}$. 240.5 nm ($\epsilon$ 21,600). (Found: C, 72.3; H, 7.9. $C_{22}H_{29}ClO_2$. ¼$H_2O$ requires C, 72.3; H, 8.1 percent).

EXAMPLE 9

6β, 11β-Dichloro-17α-ethynyl-17β-hydroxyoestr-4-en-3-one XXII a. From 11β-Chloro-17α-ethynyl-3-ethoxyoestra-3,5-dien-17β-ol XX ($R = C_2H_5$)

Sodium acetate (0.5 g.) in water (5 ml.) was added to 11β-chloro-17α-ethynyl-17β-hydroxy-3-ethoxyoestra-3,5-diene XX ($R = C_2H_5$) (1 g.) in acetone (40 ml.). The solution was cooled to 0° in an atmosphere of nitrogen and N-chloro-succinimide (560 mg.) was added, followed immediately by acetic acid (0.5 ml.). The solution was stirred at 0° for 30 min. and poured into ice cold water. The white precipitate was collected and crystallized from aqueous acetone to give 6β,11β-dichloro-17α-ethynyl-17β-hydroxyoestr-4-en-3-one XXII (0.55 g.), m.p. 189°–192°. (Found: C, 65.6; H, 6.35; Cl, 19.3. $C_{20}H_{24}Cl_2O_2$ requires C, 65.4; H, 6.6; Cl, 19.3 percent).

b. From 11β-chloro-17α-ethynyl-3-methoxyoestra-3,5-dien-17β-ol XX ($R = CH_3$)

Sodium acetate (0.45 g.) in water (4.5 ml.) was added to 11β-chloro-17α-ethynyl-3-methoxyoestra-3,5-dien-17β-ol XX ($R = CH_3$) (0.868 g.) in acetone (30 ml.) at 0°. N-chlorosuccinimide (0.55 g.) and acetic acid (0.45 ml.) were added and after 2 hr. the mixture was diluted with water. The precipitate was collected and crystallized from ether to give 6β,11β-dichloro-17β-ethynyl-17β-hydroxyoestr-4-en-3-one XXII (0.21 g.), m.p. 184°–186°, $[\alpha]_D$ − 12° (c, 0.95 in dioxan), $\lambda_{max}$. (in EtOH) 237 nm ($\epsilon$ 14,400) (Found: C, 64.8; H, 7.0; Cl, 19.0. $C_{20}H_{24}Cl_2O_2$ requires C, 65.4; H, 6.6; Cl, 19.3 percent).

EXAMPLE 10

6,11β-Dichloro-17α-ethynyl-3-ethoxyoestra-3,5-dien-17β-ol XXIII

6β,11β-Dichloro-17α-ethynyl-17β-hydroxyoestr-4-en-3-one XXII (200 mg.) was dissolved in dioxan (5 ml.) and triethylorthoformate (0.2 ml.) and sulphosalicylic acid (20 mg.) were added under nitrogen. The solution was stirred at room temperature for 90 min. and then poured into sodium bicarbonate solution. The steroid was extracted with ether containing a trace of pyridine and crystallized from aqueous methanol to give 6,11β-dichloro-17α-ethynyl-3-ethoxyoestra-3,5-dien-17β-ol XXIII (150 mg.), m.p. 110°–114°, $\lambda_{max}$. (in EtOH) 251 nm ($\epsilon$ 23,280).

EXAMPLE 11

6α,11β-Dichloro-17α-ethynyl-17β-hydroxyoestr-4-en-3-one XXIV 6,11β-Dichloro-17α-ethynyl-3-ethoxyoestra-3,5-dien-17β-ol XXIII (260 mg.) was dissolved in acetic acid (10 ml.) and the solution was allowed to stand at room temperature for 17 hr. The reaction mixture was poured into sodium bicarbonate solution and the white solid was filtered off, washed with water and dried. Crystallization from acetone/petroleum ether (40°–60°) gave 6α,11β-dichloro-17α-ethynyl-17β-hydroxyoestr-4-en-3-one XXIV (90 mg.), m.p. 172°–174°, $\lambda_{max}$. (in EtOH) 233 nm, ($\epsilon$ 14,970). (Found: C, 65.4; H, 6.6. $C_{20}H_{24}Cl_2O_2$ requires C, 65.4; H, 6.6 percent).

EXAMPLE 12

11β-Chloro-17α-ethynyl-17β-hydroxyoestra-4,6-dien-3-one XXI 11β-Chloro-17α-ethynyl-3-ethoxyoestra-3,5-dien-17β-ol XX ($R = C_2H_5$) (500 mg.) was dissolved in t-butanol (25 ml.) and chloranil (1 g.) was added. The solution was refluxed under nitrogen for 3 hr., ethyl acetate was added and the solution was washed with 2N-sodium hydroxide, water, dried ($MgSO_4$) and evaporated. Trituration of the residue with ether and crystallization from aqueous methanol gave 11β-chloro-17α-ethynyl-17α-hydroxyoestra-4,6-dien-3-one XXI (100 mg.), m.p. 255°–260° (decomp.), $\lambda_{max}$. (in EtOH) 280 nm ($\epsilon$ 28,000). $[\alpha]_D$ + 30° (c, 0.5 in dioxan) (Found: C, 72.5; H, 7.0. $C_{20}H_{23}Cl_2O_2$ requires C, 72.6; H, 7.0 percent).

EXAMPLE 13

17α-Acetoxy-6β,11β-dichloro-19-norpregn-4-ene-3,20-dione XV 3,17α-Diacetoxy-11β-chloro-19-norpregna-3,5-dien-20-one X (329 mg.) in dry, ethanol-free, chloroform (10 ml.), dry triethylamine (1.2 ml.) and dry glacial acetic acid (1.8 ml.) at 0° was treated with a 0.147M solution of chlorine in carbon tetrachloride (5.5 ml., 1.05 mole equivalents). The solution was stirred at 0° for 1 hr. before being partitioned between chloroform and dilute aqueous sodium bicarbonate. The chloroform layer was dried ($MgSO_4$), filtered and evaporated under reduced pressure to leave a white foam. This was subjected to preparative thin layer chromatography on silica gel containing ultraviolet fluorescing agents.

Two main bands were isolated, the more polar (76 mg.) being the desired 17α-acetoxy-6β,11β-dichloro-19-norpregn-4-ene-3,20-dione. XV. The less polar substance (215 mg.) failed to exhibit the absorption characteristic of an α,β-unsaturated ketone when the chromatogram was examined by an ultra-violet lamp emitting at 254 nm and hence may be presumed to contain only isolated chromophores.

Examination of this substance by proton magnetic resonance spectroscopy indicated that it was either 3ε,17α-diacetocy-3ε,6β,11β-trichloro-19-norpregn-4-en-20-one XIII or 3,17α-diacetoxy-5ε,6β,11β-trichloro-19-norpregn-3-en-20-one XIV or a mixture of these compounds. When dissolved in glacial acetic acid (10 ml.), heated on a steam-bath for 30 minutes and isolated by the removal of the solvent under reduced pressure this material afforded 17α-acetoxy-6β,11β-dichloro-19-norpregn-4-ene-3,20-dione identical in all respects with that obtained above. This crystallized on trituration with ether to give white prisms, m.p. 183°–185° dec. $[\alpha]_D$ + 3.9° (dioxan, c 0.89), $\lambda_{max}$. (in EtOH) 237 nm ($\epsilon$ 15,500). Found: C, 61.2; H, 6.6; Cl, 16.05. $C_{22}H_{28}Cl_2O_4$, ¼ $H_2O$ requires C, 61.15; H, 6.65; Cl, 16.45 percent).

EXAMPLE 14

17α-Acetoxy-3-ethoxy-6,11β-dichloro-19-norpregn-3,5-dien-20-one. XVI

17α-Acetoxy-6β,11β-dichloro-19-norpregn-4-ene-3,20-dione XV (144 mg.) and triethyl orthoformate (2 ml.) in dry dioxan (5 ml.) were treated with sulphosalicylic acid (38 mg.). After 2 hr, at room temperature, pyridine (5 drops) was added to the solution which was then partitioned between ether and water. The ether layer was washed twice with water, dried over magnesium sulphate, filtered and evaporated to leave a colorless foam. This was crystallized from ether to afford 17α-acetoxy-3-ethoxy-6,11β-dichloro-19-norpregna-3,5-dien-20-one XVI (84 mg.) as colorless prisms, m.p. 128° dec., $[α]_D$ − 78.2°, (c, 0.71, in dioxan), $λ_{max}$ (in EtOH) 251 nm, (ε, 21,950) (Found: C, 63.4; H, 7.0; Cl, 15.05 $C_{24}H_{32}Cl_2O_4$ requires C, 63.25; H, 7.1; Cl, 15.55 percent).

EXAMPLE 15

17α-Acetoxy-6α,11β-dichloro-19-norpregn-4-ene-3,20-dione XII

17α-Acetoxy-6,11β-dichloro-3-ethoxy-19-norpregna-3,5-dien-20-one XVI (228 mg.) was dissolved in glacial acetic acid (5 ml.) and the solution was allowed to stand at room temperature overnight. The solvent was removed under reduced pressure and the residual gum was subjected to preparative thin layer chromatography. This afforded two products, the more polar (82 mg.) being identical with 17α-acetoxy-6β,11β-dichloro-19-norpregn-4-ene-3,20-dione XV. The less polar product (55 mg.), which crystallized as prisms on contact with ether, was characterized as the desired 17α-acetoxy-6α,11β-dichloro-19-norpregn-4-ene-3,20-dione XII by its proton magnetic resonance spectrum (in $CDCl_3$) which showed signals at τ5.62 (broad multiplet, protons at $C_{6β}$ and $C_{11α}$ respectively), τ 4.46 (singlet, 1 proton at $C_4$).

EXAMPLE 16

17α-Acetoxy-6,11β-dichloro-19-norpregna-4,6-diene-3,20-dione XVII

17α-Acetoxy-6,11β-dichloro-3-ethoxy-19-norpregn-3,5-dien-20-one XVI (196 mg.) in dry t-butanol (50 ml.) was treated with chloranil (187 mg.). The mixture was refluxed with stirring for 2½ hr, the solvent was removed under reduced pressure and the residue was taken up in ether (300 ml.) and washed with 2N aqueous sodium hydroxide followed by water. The ethereal solution was dried ($MgSO_4$) and evaporated to afford a foam (100 mg.). This was subjected to preparative thin layer chromatography to give 17α-acetoxy-6,11β-dichloro-19-norpregna-4,6-dien-3,20-dione XVII, $λ_{max}$ (in EtOH) 280 nm (ε 19,600) as a colorless foam (35 mg.).

EXAMPLE 17

11β-Chloro-17α-hydroxy-19-norpregn-4-ene-3,20-dione IX

11α,17α-Dihydroxy-19-norpregn-4-ene-3,20-dione VIII 106 mg.), 2-chloro-1,1,2trifluorotriethylamine (0.2 ml.) and anhydrous lithium chloride (500 mg.) were stirred together in dry tetrahydrofuran (10 ml.) for 2 hours at room temperature. The reaction mixture was partitioned between chloroform and water and the organic layer was dried and evaporated to leave a gum. This was subjected to preparative thin-layer chromatography which afforded the main product as crystals. These were recrystallized from acetone/pertroleum ether (60°–80°) to give 11β-chloro-17α-hydroxy-19-norpregn-4-ene-3,20-dione IX (61 mg., 55 percent) as prisms, m.p. 196°–198°, $[α]_D$ + 128° (dioxan, c 0.64), $λ_{max}$ 232.5 nm. (ε 17,400) in tetrahydrofuran, (Found: C, 68.4; H, 7.75; Cl, 9.64. $C_{20}H_{27}ClO_3$ requires C, 68.4; H, 7.8; Cl, 10,1 percent).

EXAMPLE 18

3,17α-Diacetoxy-11β-chloro-19-norpregna-3,5-dien-20-one X

11β-Chloro-17α-hydroxy-19-norpregn-4-ene-3,20-dione IX (86 mg.) and toluene-p-sulphonic acid monohydrate (79 mg.) in dichloro-methane (2 ml.) were treated with acetic anhydride (2 ml.). After 6 hours at room temperature, the solution was poured into chloroform and washed with aqueous sodium bicarbonate. The organic layer was dried and evaporated under reduced pressure to give a colorless crystalline residue which on recrystallization from acetone/petroleum ether (60°–80°) afforded 3,17α-diacetoxy-11β-chloro-19-norpregna-3,5-dien-20-one X (46 mg., 47 percent) as colorless needles m.p. 219°–221°, $[α]_D$ − 56.6° (dioxan, c 0.64), $λ_{max}$ 234 nm. (ε 18,400) (Found: C, 66.3; H, 7.2; Cl, 8.0. $C_{24}H_{31}ClO_5$ requires C, 66.3; H, 7.2; Cl, 8.15 percent).

EXAMPLE 19

17α-Acetoxy-11β-chloro-19-norpregn-4-ene-3,20-dione XI 3,17α-Diacetoxy-11β-chloro-19-norpregna-3,5-diene-20-one X (101 mg.) in tetrahydrofuran (10 ml.) was treated with 1 equivalent of methanolic potassium hydroxide. After 15 minutes the solution was partitioned between water and ether and the ether layer was dried and evaporated to leave a crystalline residue. This was recrystallized from acetone/cyclohexane to afford 17α-acetoxy-11β-chloro-19-norpregn-4-ene-3,20-dione XI (71 mg., 78 percent) as colorless needles, m.p. 211°–212°, $[α]_D$ + 69.1° (dioxan, c 0.94), $λ_{max}$ 237.5 nm. (ε 17,300) (Found: C, 67.1; H, 7.5; Cl. 8.9. $C_{22}H_{29}ClO_4$ requires C, 67.2; H, 7.45; Cl, 9.0 percent).

EXAMPLE 20

11β-Chloro-oestr-4-ene-3,17-dione

Lithium chloride (3.3 g.) was added to a solution of 11α-hydroxyoestr-4-ene-3,17-dione (5 g.) in tetrahydrofuran (125 ml.) under nitrogen at 0°, followed by N-(2-chloro-1,1,2-trifluoroethyl)-diethylamine (5 ml.). After 30 min. the mixture poured into iced water (3 l. ) to precipitate 11β-chloro-oestr-4-ene-3,17-dione (4.68 g.), m.p. 160°–164°, $λ_{max}$ (in EtOH) 238 nm. (ε 16,200).

EXAMPLE 21

11β-Chloro-3-methoxyoestra-3,5-dien-17-one

Methyl orthoformate (2.5 ml.) and toluene-p-sulphonic acid (35 mg.) were added under nitrogen to 11β-chloro-oestr-4-ene-3,17-dione (2.5 g.) in dioxan (12.5 ml.) and the solution was stirred for 70 min. The reaction mixture was poured into sodium bicarbonate solution and the steroid was extracted with ether containing a trace of pyridine. Removal of solvent from the extract left a gum, which was triturated with methanol containing a trace of pyridine to give 11β-chloro-3-methoxy-oestra-3,5-dien-17-one (1.45 g.), m.p. 128°–131°, $[α]_D$ + 2° (c, 0.5 in dioxan), $λ_{max}$ (in EtOH) 241 nm. (ε 18,000).

EXAMPLE 22

11β-Chloro-17α-ethynyl-3-methoxyoestra-3,5-dien-17β-ol

Sodium (1.25 g.) was added to liquid ammonia (ca. 250 ml.) containing ferric nitrate (25 mg.), the solution was stirred for 90 min., and the acetylene was passed through the solution for 2 hr. A solution of 11β-chloro-3-methoxyoestra-3,5-diene-17-one (2.65 g.) in tetrahydrofuran (75 ml.) was added and acetylene was passed through the solution for 20 hr., during which time the ammonia evaporated.

Ammonium chloride was added, followed by sodium bicarbonate solution and the steroid was extracted with ether containing a trace of pyridine. Crystallization from methanol containing a trace of pyridine gave 11β-chloro-17α-ethynyl-3-methoxyoestra-3,5-dien-17β-ol (1.55 g.), m.p. 139°–144°; $λ_{max}$ (in EtOH) 240 nm. (ε 18,400).

EXAMPLE 23

11β-Chloro-3-ethoxyoestra-3,5-dien-17-one

Ethyl orthoformate (12.1 ml.) and toluene-p-sulphonic acid (168 mg.) were added under nitrogen to 11β-chloro-oestr-4-ene-3,17-dione (12.1 g.) in dioxan (60 ml.) and the solution was stirred for 90 min. The reaction mixture was poured into sodium bicarbonate solution and the steroid was extracted with ether containing a trace of pyridine. The solvent was removed from the extract to leave a gum, which was triturated with methanol containing a trace of pyridine to give 11β- chloro-3-ethoxyoestra-3,5-dien-17-one (7.7 g.), m.p. 142°–146°, $[\alpha]_D + 1°$ (c, 1.0 in dioxan); $\lambda_{max.}$ 240 nm. ($\epsilon$ 20,400) (Found: C, 71.0; H, 7.9; Cl, 10.6. $C_{20}H_{27}ClO_2$ requires C, 71.7; H, 8.1; Cl, 10.6 percent).

EXAMPLE 24

6,11β-Dichloro-17α-ethynyl-17β-hydroxyoestra-4,6-dien-3-one 6,11β-Dichloro-17α-ethynyl-3-ethoxyoestra-3,5-dien-17β-ol (500 mg.) was dissolved in t-butanol (50 ml.) and chloranil (500 mg.) was added. The solution was refluxed under nitrogen for 3.5 hr., ethyl acetate was added and the solution was washed with N-sodium hydroxide, water, dried ($MgSO_4$) and evaporated. The crude product was chromatographed on silica and crystallized from aqueous methanol to give 6,11β-dichloro-17α-ethynyl-17β-hydroxyoestra-4,6-dien-3-one (84 mg.), m.p. 242°–248° (decomp), $\lambda_{max.}$ 281 nm. ($\epsilon$ 20,500) (Found: C, 65.5; H, 5.8. $C_{20}H_{22}Cl_2O_2$ requires C, 65.7; H, 6.1 percent).

EXAMPLE 25 a. 3-Ethoxy-11α-hydroxyoestra-3,5-dien-17-one

Toluene-p-sulphonic acid (240 mg.) and ethyl orthoformate (4 ml.) were added under nitrogen to 11α-hydroxyoestr-4-ene-3,17-dione (4 g.) in dioxan (100 ml.). After 3 hr. the reaction mixture was poured into sodium bicarbonate solution and the steroid was extracted with ether containing a trace of pyridine. Crystallization from methanol containing a trace of pyridine gave 3-ethoxy-11α-hydroxyoestra-3,5-dien-17-one (2.86 g.), m.p. 126°–130°, $[\alpha]_D - 150°$ (C, 0.6 in dioxan), $\lambda_{max.}$ (in EtOH) 241 nm. ($\epsilon$ 18,500), (Found: C, 74.9; H, 9.2. $C_{20}H_{28}O_3 \cdot 1/4 H_2O$ requires C, 75.1; H, 8.9 percent).

b. 11α-Hydroxyoestra-4,6-diene-3,17-dione

3-Ethoxy-11α-hydroxyoestra-3,5-dien-17-one (250 mg.) was dissolved in t-butanol (25 ml.) and chloranil (250 mg.) was added. The solution was heated under nitrogen at 50° for 45 min., ethyl acetate was added and the solution was washed with N-sodium hydroxide, water, dried ($MgSO_4$) and evaporated. The crude product was chromatographed on silica and crystallized from acetone/petroleum ether (b.p. 40°–60) to give 11α-hydroxyoestra-4,6-diene-3,17-dione (20 mg.), m.p.192–196, $\lambda_{max.}$ (in EtOH) 282 nm.

c. 11β-Chloro-oestra-4,6-diene-3,17-dione

11α-Hydroxyoestra-4,6-diene-3,17-dione (68 mg.), 2-chloro-1,1,2-trifluorotriethylamine (0.1 ml.) and anhydrous lithium chloride (50 mg.) were stirred in dry tetrahydrofuran (3 ml.) for 15 min. The reaction mixture was partitioned between chloroform and water and the organic layer was dried ($MgSO_4$) and evaporated to give a gum. This was chromatographed to give 11β-chloro-oestra-4,6-diene-3,17-dione (25 mg.), m.p. 168°–172°, $\lambda_{max.}$ (in EtOH) 280 nm. ($\epsilon$ 19,400) (Found: Cl, 11.3. $C_{18}H_{21}ClO_2$ requires Cl, 11.6 percent).

EXAMPLE 26

17α-Acetoxy-6α,11β-dichloro-19-norpregn-4-ene-3,20-dione

17α-Acetoxy-6β,11β-dichloro-19-norpregn-4-ene-3,20-dione (1.152 g.) in dry dioxan (35 ml.) was treated with ethyl orthoformate (15 ml.) and sulphosalicylic acid (120 mg.). The solution was stirred for 2 hr. at room temperature, after which pyridine (1 ml.) was added and the reaction mixture was poured into ether. The solution was washed with dilute aqueous sodium bicarbonate then water, dried ($MgSO_4$) and evaporated to afford crude 17α-acetoxy-6,11β-dichloro-3-ethoxy-19-norpregn-3,5-dien-20-one as a golden gum. This was dissolved in acetic acid (20 ml.) containing a few drops of water. After 3 hr. at room temperature the solvents were removed under reduced pressure and the residual foam (1.146 g.) was subjected to preparative thin layer chromatography to afford pure 17α-acetoxy-6α,11β-dichloro-19-norpregn-4-ene-3,20-dione as colorless prisms. Recrystallization from acetone/light petroleum afforded prisms (358 mg.), m.p. 167°–168° dec., $[\alpha]_D + 17°$ (Dioxan, c 0.74), $\lambda_{max.}$ 233 nm. ($\epsilon$ 15,700) (Found: C, 61.6; H, 6.9; Cl, 16.7. $C_{22}H_{28}Cl_2O_4$ requires C, 61.7; H, 6.6, Cl, 16.6 percent).

EXAMPLE 27

17α-Acetoxy-6,11β-dichloro-19-norpregna-4,6-diene-3,20-dione

Chloranil (320 mg.) was added over 30 min. to 17α-acetoxy-6,11β-dichloro-3-ethoxy-19-norpregna-3,5-dien-20-one (427 mg.) in refluxing stirred t-butanol (25 ml.) under nitrogen. After a further 90 min. the reaction mixture was poured into a mixture of ether (300 ml.), benzene (100 ml.) and ethyl acetate (100 ml.). The solution was washed with 1N aqueous sodium hydroxide (4 × 50 ml.), with water (4 × 50 ml.) and with saturated brine (2 × 100 ml.) before being evaporated to leave a pale brown foam (388 mg.).

This was subjected to preparative thin layer chromatography to afford 17α-acetoxy-6,11β-dichloro-19-norpregna-4,6-diene-3,20-dione (82 mg.) as a colorless foam, $[\alpha]_D + 70°$ (Dioxan, c 0.58)(Found: C, 62.05; H, 6.1; Cl, 16.2. $C_{22}H_{26}Cl_2O_4$ requires C, 62.1; H, 6.2; Cl, 16.7 percent).

EXAMPLE 28

17α-Acetoxy-6,11β-dichloro-19-norpregna-4,6-diene-3,20-dione

17α-Acetoxy-6,11β-dichloro-3-ethoxy-19-norpregna-3,5-dien-20-one (204 mg.) and precipitated manganese dioxide (1.024 g.) were stirred together and a mixture of glacial acetic acid (10 ml.) and water (1 ml.) was added. After 12 min. at room temperature the mixture was filtered, the manganese dioxide was washed with acetone and the combined filtrate and washings were evaporated under reduced pressure to afford a pale brown foam (220 mg.). This was chromatographed to give 17α-acetoxy-6,11β-dichloro-19-norpregna-4,6-diene-3,20-dione (116 mg.) as a colorless foam, which on crystallization from aqueous dioxan gave a 1:1 dioxan/steroid solvate m.p. 120°–130° dec., after softening at 114°–116° (cap. corr.), $[\alpha]_D + 61.7°$ (Dioxan, c 1.08), $\lambda_{max.}$ 280 nm. ($\epsilon$ 22,700)(Found: Cl,13.8. $C_{22}H_{26}Cl_2O_4 \cdot C_4H_8O_2$ requires Cl, 31.8 percent).

EXAMPLE 29

11β-Chloro-3,17α-dipropionyloxy 19-norpregna-3,5-dien-20-one

11β-Chloro-17α-hydroxy-19-norpregn-4-ene-3,20-dione (1.04 g.) in methylene chloride (20 ml.) and propionic anhydride (20 ml.) was stirred at room temperature with toluene-p-sulphonic acid (1 g.) for 6 hours. Pyridine (4 ml.) and ether (100 ml) were added, the solution was washed with diluted aqueous sodium bicarbonate and water, dried($Na_2SO_4$) filtered and evaporated under reduced pressure to a solid which was recrystallized from ether/petrol to afford 11α-chloro-3,17α-dipropionyloxy-19-nor-pregna-3,5-dien-20-one (346 mg.) as colorless prisms, m.p. 170°–177°, $[\alpha]_D - 46°$ (Dioxan c 1.14), $\lambda_{max}$ 233 nm. ($\epsilon$ 19,400), (Found: C, 67.4; H, 7.4; Cl, 7.6. $C_{26}H_{35}ClO_5$ requires C, 67.5; H, 7.62; Cl 7.66 percent).

EXAMPLE 30

11β-Chloro-17α-propionyloxy-19-norpregn-4-ene-3,20-dione

11β-Chloro-3,17α-dipropionyloxy-19-norpregna-3,5-dien-20-one (296 mg.) in tetrahydrofuran (5 ml.) was treated under nitrogen with 0.104N sodium hydroxide in methanol (0.615 ml.). After 30 minutes at room temperature the solution was diluted with ether, washed with water, dried ($Na_2SO_4$), filtered and evaporated under reduced pressure to leave a white foam. This was subjected to preparative thin layer chromatography to give a material which on recrystallization from ether/hexane afforded 11β-chloro-17α- propionyloxy-19-norpregn-4-ene-3,20-dione (89 mg.) as colorless prisms, m.p. 144°–146°, $[\alpha]_D$ + 57° (Dioxan c 0.70), $\lambda_{max}$. 237 nm. ($\epsilon$ 17,500), (Found: C, 66.9, H, 7.4; Cl, 8.7 $C_{23}H_{31}ClO_4$, 1/4$H_2O$ requires C, 67.1; H, 7.7; Cl, 8.6 percent).

EXAMPLE 31 a. 11α-Hydroxy-19-norpregn-4-ene-3,20-dione.

A solution of 20,20-ethylenedioxy-3-methoxy-19-norpregna-1,3,5(10)-trien-11α-ol (2.24 g., 6 mmole.) in dry tetrahydrofuran (70 ml.) was added to a stirred mixture of liquid ammonia (140 ml.) and dry t-butanol (70 ml.). Lithium (2.24 g.) was added and the mixture was stirred for 6 hr. Ethanol (70 ml.) was then added and the ammonia and solvent were evaporated. The residue was partitioned between ether and water. The ether layer was washed with water, dried (MgSO$_4$) and evaporated. A solution of the residue in methanol (70 ml.), water (26ml.) and concentrated hydrochloric acid (7 ml.) was heated under reflux for 3 hr. The reaction mixture was cooled and partitioned between chloroform and water. The chloroform layer was washed with water and dried (MgSO$_4$). Evaporation of the extract left a residue (2 g.) which on purification by chromatography and crystallization from acetone-petroleum ether (b.p. 60°–80°) gave 11α-hydroxy-19-nor-pregn-4-ene-3,20-dione (1 g., 53 percent), m.p. 166°–167°, $[\alpha]_D$ + 15.5°, (CHCl$_3$), $\lambda_{max}$. 240 nm. ($\epsilon$ 17,150).

b. 11β-Chloro-19-norpregn-4-ene-3,20-dione

A mixture of 11α-hydroxy-19-norpregn-4-ene-3,20-dione (0.474 g., 1.5 mmole.), lithium chloride (2 g.), 2-chloro-1,1,2-trifluorotriethylamine (0.57 ml. 3.7 mmole.) and dry tetrahydrofuran (20 ml.) was stirred at 0° for 3 hr. and at room temperature for a further 2 hr. The reaction mixture was poured into water and extracted with chloroform. The extract was washed with water, dried (MgSO$_4$) and evaporated. The residue (1.17 g.) was purified by chromatography and crystallization from acetone-petroleum ether (b.p. 60°–80°) to give 11β-chloro-19-norpregn-4-ene-3,20-dione (0.246 g., 50 percent). m.p. 135°–136°, $[\alpha]_D$ + 218° (CHCl$_3$), $\lambda_{max}$. 237 nm. ($\epsilon$ 17,400), (Found: C, 71.7; H, 8.3; Cl, 10.6. $C_{20}H_{27}ClO_2$ requires C, 71.7; H, 8.1; Cl, 10.6 percent).

EXAMPLE 32

11β-Chloro-3-ethoxy-17α-(2-methylprop-2-enyl)oestra-3,5-dien-17β-ol

11β-Chloro-3-ethoxyoestra-3,5-diene-17-one (639 mg.) in tetrahydrofuran (50 ml.) was added dropwise with stirring under nitrogen to the Grignard reagent prepared from 1-chloro-2-methylprop-2-ene (1.2 ml.) and magnesium turnings (0.32 g.) in anhydrous ether (30 ml.). The reaction temperature was kept below 10° during the additions. The mixture was allowed to reach room temperature and stirred for a further 2 hr. Saturated ammonium chloride solution (5 ml.) was added slowly with stirring followed by pyridine (2 drops) and water (30 ml.). Isolation by extraction with ether gave a yellow oil (840 mg.) which crystallized from aqueous methanol (containing a trace of pyridine) to give 11β-chloro-3-ethoxy-17α-(2-methylprop-2-enyl)-oestra-3,5-dien-17β-ol (220 mg.), m.p. 62°–64°, $[\alpha]_D$ − 16° (C, 0.94 dioxan), $\lambda_{max}$. (in EtOH) 240 nm. ($\epsilon$ 17.300).

EXAMPLE 33

11β-Chloro-17β-hydroxy-17α-(2-methylprop-2-enyl)oestr-4-en-3-one

Crude 11β-chloro-3-ethoxy-17α-(2-methylprop-2-enyl) oestra-3,5-dien-17β-ol (820 mg.) was dissolved in acetone (10 ml.) and 2N hydrochloric acid (1 ml.) and stirred at 20° for 30 min. The solution was then concentrated by evaporation, diluted with water and extracted with ether to yield a white froth (663 mg.), which on chromatography and crystallization from ether-petroleum ether (b.p. 40°–60°) gave 11β-chloro-17β-hydroxy-17α-(2-methylprop-2-enyl)-oestr-4-en-3-one (137 mg.), as a hemihydrate, m.p. 132°, $[\alpha]_D$ + 95° (C, 0.78 dioxan) $\lambda_{max}$. (in EtOH) 240 nm. ($\epsilon$ 18,050) (Found: C, 71.1; H, 8.6; Cl, 9.6. $C_{22}H_{31}ClO_2$.0.5$H_2O$ requires C, 71.1; H, 8.5; Cl, 9.5 percent).

EXAMPLE 34

11β-Chloro-3-ethoxy-17α-(prop-2-enyl)-oestra-3,5-dien-17β-ol

11β-Chloro-3-ethoxyoestra-3,5-dien-17-one (640 mg.) was converted into 11β-chloro-3-ethoxy-17β-hydroxy-17α-(prop-2-enyl)-oestra-3,5-diene by the Grignard reagent prepared from 1-chloroprop-2-ene and magnesium using a method similar to that described in Example 32. The crude 11β-chloro-3-ethoxy-17α-(prop-2-enyl)-oestra-3,5-dien-17β-ol was obtained as a yellow froth (806 mg.), showing infrared absorption at 1,650 and 1,630 cm.$^{-1}$ (3,5-diene).

Example 35

11β-Chloro-17β-hydroxy-17α-(prop-2-enyl)-oestra-4-en-3-one

Crude 11β-chloro-3-ethoxy-17α-(prop-2-enyl)-oestra-3,5-dien-17β-ol (800 mg.) was hydrolyzed with hydrochloric acid in aqueous acetone to give a white froth (663 mg.), which was purified by chromatography and crystallization from ether-petroleum ether (b.p. 40°–60°to give 11β-chloro-17β-hydroxy-17α-(prop-2-enyl)-oestr-4-en-3-one (265 mg.), m.p. 125°, $[\alpha]_D$ + 95.5° (C, 1.06 dioxan), $\lambda_{max}$. (EtOH) 239 nm. ($\epsilon$ 19,350) (Found: C, 72.1; H, 8.5; Cl, 9.9. $C_{21}H_{29}ClO_2$ requires C, 72.3; H, 8.4; Cl, 10.2 percent).

EXAMPLE 36

11β-Chloro-17β-hydroxy-17α-(1-methylprop-2-enyl)-oestr-4-en-3-one and 11β-chloro-17α-(but-2-enyl)-17β-hydroxy-oestr-4-en-3-one 11β-Chloro-3-ethoxy-oestra-3,5-dien-17-one (640 mg.) was converted into a mixture (809 mg.) of the enol ethers of the titled compounds by the Grignard reagent prepared from 1-bromobut-2-ene and magnesium using a method similar to that described in Example 32.

The crude mixture of enol ethers was hydrolyzed with hydrochloric acid in aqueous acetone to give a yellow froth (672 mg.), which was separated by chromatography into two fractions.

The less polar fraction (313 mg.) was crystallized from ether to give 11β-chloro-17β-hydroxy-17α-(1-methylprop-2-enyl)-oester-4-en-3-one (67 mg.), m.p. 162.5°–164.5°, $[\alpha]_D$ + 92° (C, 0.44 dioxan), $\lambda_{max}$. (in EtOH) 238 nm. ($\epsilon$ 18,000) with an infrared spectrum showing absorption at 900 cm.$^{-1}$ (vinylidene).

The more polar fraction (235 mg.) was crystallized from ether-petroleum ether (b.p. 40°–60°) to give 11β-chloro-17β-hydroxy-17α-(but-2-enyl)-oestr-4-en-3-one (12 mg.), m.p. 167.5°, $\lambda_{max}$. (in EtOH) 239 nm. ($\epsilon$ 17,550), with an infrared spectrum showing absorption at 960 cm.$^{-1}$ (trans disubstituted double bond).

EXAMPLE 37

11β-Chloro-oestr-4-ene-3,17-dione from 11α-hydroxy-oestr-4-ene-3,17-dione using triphenylphosphine-carbon tetrachloride The hydroxysteroid (0.842 g.) was dissolved by refluxing under nitrogen in carbon tetrachloride (25 ml.) and tetrahydrofuran (15 ml.). Triphenylphosphine (0.13 g.) and chloroform (4 ml.) were added and the solution was refluxed for 3 hr., during which time a crystalline product precipitated. The solution was filtered and the filtrate was washed with water, dried and evaporated to give an oil (1.98 g.). This was chromatographed on silica gel, and crystallized from methanol to give 11β-chloro-oestr-4-ene-3, 17-dione (0.225 g.) as colorless prisms, m.p. 189°–190°, $[\alpha]_D$+ 189° (c, 0.71 CHCl$_3$), $\lambda_{max}$. (in EtOH) 237 nm. ($\epsilon$ 17,100) (Found: C, 70.2; H, 7.3;

Cl, 11.5. Calc. for $C_{18}H_{23}ClO_2$ C, 70.5; H, 7.6; Cl, 11.6 percent).

EXAMPLE 38

17α-Acetoxy-11β-chloro-19-norpregna-4,6-diene-3,20-dione 3,17α-Diacetoxy-11β-chloro-19-norpregna-3,5-dien-20-one (507 mg.) and precipitated manganese dioxide (2.26 g.) were stirred together and ethyl acetate (10 ml.) and 90 percent acetic acid (2.5 ml.) were added. After 20 minutes the manganese dioxide was removed by filtration and washed with hot ethyl acetate and the combined filtrate and washings were evaporated under reduced pressure and subjected to preparative thin layer chromatography. The main component from chromatograph was osolated and crystallized from methyl acetate/cyclohexane to afford 17α-acetoxy-11β-chloro-19-norpregna-4,6-diene-3,20-dione (133 mg.) as colorless needles, m.p. 204–207, / $\alpha/_D$ + 71° (Dioxan $c$ 0.92), $\lambda_{max}$ 279 nm. ($\epsilon$ 26,100), (Found: C, 66.4; H, 6.7; Cl, 8.9 $C_{22}H_{27}ClO_4$, ½$H_2O$ requires C, 66.1; H, 7.05; Cl, 8.85 percent).

EXAMPLE 39

17α-Hydroxypregna-1,4,9-triene-3,20-dione.

11β, 17α-Dihydroxypregna-1,4-diene-3,20-dione (55.5 g.), (prepared by the reduction of 21-iodo-prednisolone with sodium metabisulphite in aqueous dioxan) in anhydrous pyridine (825 ml.) at 14° to 16° was treated with dry recrystallized N-bromo-succinimide (40.2 g.). The solution was stirred at 14° to 16° for 25 minuted in the absence of light. Sulphur dioxide was blown gently over the surface of the stirred solution until there was no reaction to acidified starch/iodide paper. Water (3 l.) was added, dropwise at first and then more rapidly. The mixture was poured into an excess of 2N-aqueous hydrochloric acid (about 5 l.) and stirred for a few minutes, and the product was collected, washed thoroughly with water and dried over phosphorus pentoxide in vacuo to yield 46.9 g. (89 percent) of 17α-hydroxy-pregna-1,4,9-triene-3,20-dione m.p. 187°–192°. Recrystallization of a small quantity from acetone afforded material, m.p. 215°–217°

EXAMPLE 40

3,17α-Dihydroxy-19-norpregna-1,3,5, (10),9-tetraen-20-one

17α-Hydroxypregna-1,4,9 - triene - 3, 20-dione (64 g), zinc chloride (47 g.), activated zinc (1 kg.), dry industrial methylated spirits (5 l.) pyridine (500 ml.) and water (50 ml.) were refluxed gently with stirring for 3 hours. The zinc was filtered off and washed with hot industrial methylated spirits and the combined washings and filtrate were evaporated under reduced pressure to about 700 ml. The solution was poured into water (10 l.) containing an excess of hydrochloric acid and after stirring for some minutes the product was collected, washed thoroughly with water and dried to give 59.5 g. (97 percent) of 3,17α-dihydroxy-19-norpregna-1,3,5 (10),9-tetraen-20-one m.p. 211°–214°.

A small amount of this material crystallized from acetone to yield the pure phenol as pale yellow prisms, m.p. 234,236°, $[\alpha]_D$ + 151° (dioxan, $c$ 0.88); $\lambda_{max}$ 263 nm. ($\epsilon$ 18,500) and 299 nm ($\epsilon$ 2,900) (Found: C, 76.6, 76.4; H, 8.1, 7.8. $C_{20}H_{24}O_3$ requires C, 76.9; H,7.75 percent).

EXAMPLE 41

17α-Hydroxy-3-methoxy-19-norpregna-1,3,5(10),9-tetraen-20-one V 3,17α-Dihydroxy-19-norpregna-1,3,5(10),9-tetraen-20-one IV (59.5 g.) anhydrous potassium carbonate (250 g.), dimethyl sulphate (150 ml.) and acetone (2 l.) were refluxed gently with stirring for 4 hours. Water (3 l.) was added slowly and the mixture was allowed to cool slowly with stirring overnight. The crystalline product was collected, washed thoroughly with water and dried over phosphorus pentoxide in vacuo to afford 17α-hydroxy-3-methoxy-19-norpregna-1,3,5(10),9-tetraen-20-one V. (58.2 g., 94 percent) as colorless leaves m.p. 188°–191°. Recrystallization of a small quantity from acetone/cyclohexane afforded a pure sample m.p. 201°–203° $[\alpha]_D$ + 150° (dioxan, $c$ 0.81), $\lambda_{max}$ 262nm. ($\epsilon$ 19,900) and 298 nm. ($\epsilon$ 2,900) (Found: C, 77.3; H, 7.9 $C_{21}H_{26}O_3$ requires C, 77.25; H, 8.05 percent).

EXAMPLE 42

20,20-Ethylenedioxy-3-methoxy-19-norpregna 1,2,5(10),9-tetraen-17α-ol.

17α-Hydroxy-3-methoxy-19-norpregna-1,3,5(10), 9-tetraen-20-one (20 g.), pyridine hydrochloride (2.2 g.), dry ethylene glycol (200 ml.) and dry diglyme (400 ml.) were adjusted to pH 4 with concentrated hydrochloric acid and the solution was distilled very slowly at 120°–130° under nitrogen at 220 mm. until examination by thin-layer chromatography indicated that the reaction was complete. The reaction mixture was poured into very dilute sodium hydroxide (5 l.) and the precipitated crude 20,20- ethylenedioxy-3-methoxy-19-norpregna-1,3,5(10),9-tetraen-17α-ol was collected, washed thoroughly and dried to afford an amorphous powder (21.9 g. 96 percent).

Recrystallization of a small amount from methanol containing a trace of pyridine gave the pure ketal as colorless prisms, m.p. 164°–166°, $[\alpha]_D$ + 93° (dioxan, $c$ 0.83), $\lambda_{max}$ 262 nm ($\epsilon$ 19,400) and 298 nm. (inflexion, $\epsilon$ 3,300) (Found: C, 74.7; H, 8.0. $C_{23}H_{30}O_4$ requires C, 74.55; H, 8.15 percent).

EXAMPLE 43

20,20-Ethylenedioxy-3-methoxy-19-norpregna-1,3,5(10)-triene-11α, 17α-diol 20,20-Ethylenedioxy-3-methoxy-19-norpregna-1,3,5(10),-9 - tetraen-17α-ol (21 g.) in dry diglyme (400 ml.) was treated at 0° with a stress of diborane generated externally in dry nitrogen. The diborane was generated by the slow addition of boron trifluoride etherate (100 ml.) in anhydrous ether (100 ml.) and dry diglyme (100 ml.) to a stirred slurry of sodium borohydride (40 g.) and diglyme (400 ml.). After 2 hours the reaction mixture was allowed to warm to room temperature and the addition of diborane was continued for a further 3 hours. The solution was cooled and 2N-sodium hydroxide (200 ml.) was added, followed by 30 percent hydrogen peroxide (50 ml.). The mixture was allowed to stand at room temperature for 20 minutes and was partitioned between ether and water. The ether layer was washed well with water, 5 percent aqueous ferrous sulphate, again with water and dried over magnesium sulphate, and the solution was evaporated to leave a colorless foam. Chromatography over silica gel afforded pure 20,20-ethylenedioxy-3-methoxy-19-norpregna-1,3,5(10) triene-11α,17α-diol as a colorless froth (12 g., 55 percent). A small quantity was crystallized from ether to give colorless prisms, m.p. 104°–106°, $[\alpha]_D$ − 49° (dioxan, $c$ 1.0), $\lambda_{max}$ 276.5 nm. ($\epsilon$ 1,690) and 282.5 nm. ($\epsilon$ 1,570) (Found: C, 71.1; H, 8.3. $C_{23}H_{32}O_5$ requires C, 71.1; H, 8.3 percent).

EXAMPLE 44

11α,17α-Dihydroxy-19-norpregna-4-ene-3,20-dione VIII 20,20-Ethylenedioxy-3-methoxy-19-norpregna-1,3,5(10)-triene-11α,17α-diol (12 g.) in dry tetrahydrofuran (400 ml.) was added to a stirred solution of liquid ammonia (800 ml.) and dry t-butanol (400 ml.). Freshly cut lithium (12 g.) was added and the mixture was stirred under reflux for 6 hours. Ethanol (400 ml.) was added and the ammonia was allowed to evaporate overnight. The remaining solvents were removed under reduced pressure and the residue was partitioned between ether and water. The ether layer was evaporated and the residual gum was refluxed for 3 hours in methanol (400 ml.) containing water (150 ml.) and concentrated hydrochloric acid (40 ml.). The yellow solution was partitioned between chloroform and water, the organic phase was washed with water, dried and evaporated and the colorless residue was crystallized twice from ethyl acetate/cyclohexane to afford 11α,17α19-norpregn-4-ene-3,20-dione VIII (4.5 g., 44 percent) as colorless prisms.

A small amount was recrystallized to afford an analytical sample, m.p. 182°–183°, [α]$_D$ − 21° (dioxan, c 0.94), λ$_{max}$. 240.5 nm. (α 15,900) (Found: C, 72.15; H, 8.4. C$_{20}$H$_{28}$O$_4$ requires C, 72.25; H, 8.5 percent).

EXAMPLE 45

11β-Chloro-17α-chloroethynyl-17β-hydroxyoestr-4-en-3-one cis-Dichloroethylene (1.8 g.) in ether (10 ml.) was added dropwise over 15 min. to a suspension of sodamide (from 0.855 g. sodium) in ammonia (250 ml.) and the mixture was stirred under reflux for 1 hr. 11β-chloro-3-ethoxyoestra-3,5-dien-17-one (1.2 g.) in tetrahydrofuran (30 ml.) was added and the mixture was stirred under reflux for 17 hr. Ammonium chloride was added, the ammonia was evaporated and then water was added. Isolation by extraction with ether gave 11β-chloro-17α-chloroethynyl-3-ethoxyoestra-3,5-dien-17β-ol (1.03 g.) as a brown froth with infrared absorption at 1,640 and 1,660 cm$^{-1}$ (enol ether).

This enol ether in acetone (15 ml.) was treated with 2N-hydrochloric acid (2 ml.) for 1 hr. at 25°. Isolation as in Example 33 and crystallization from ether gave 11β-chloro-17α-chloroethynyl-17β-hydroxyoestr-4-en-3-one, m.p. 169°–171°, [α]$_D$ + 18 (c, 0.98 dioxan), λ$_{max}$. (in EtOH) 238 nm. (ε 17,100) (Found: Cl, 18.8. C$_{20}$H$_{24}$Cl$_2$O$_2$ requires Cl, 19.3 percent).

EXAMPLE 46

3α-Chlorocholestane.

A mixture of cholestan-3β-ol (0.5 g.) and lithium chloride (2.5 g.) in tetrahydrofuran (10 ml.) was treated with N-(2-chloro-1,1,2-trifluoroethyl)-diethylamine (1.0 ml.) at room temperature and the mixture was boiled under reflux for 2 hr. The reaction mixture was concentrated in vacuo and the residue was taken up in chloroform. The chloroform solution was washed with water, dried (MgSO$_4$) and concentrated to dryness in vacuo. The residue was triturated with alcohol and the resultant solid was crystallized from ether-alcohol to give 3α-chlorocholestane (95 mg.), m.p. 80°–81°.

EXAMPLE 47

11α-Mesyloxyoestr-4-ene-3,17-dione

11α-Hydroxyoestr-4-ene-3,17-dione (1.76 g.) in pyridine (33 ml.) was treated with methanesulphonyl chloride (2.5 ml.) at 25° for 4 hr. The reaction mixture was concentrated in vacuo and shaken with chloroform and water. The chloroform layer was evaporated to dryness and the product was purified by chromatography and crystallization from acetone to give 11α-mesyloxyoestr-4-ene-3,17-dione, m.p. 179°–180°, [α]$_D$+43° (c, 1.0 in CHCl$_3$), λ$_{max}$. (in EtOH) 236–237 nm. (ε 17,100) (Found: C, 62.3; H, 6.9; S, 8.6. C$_{19}$H$_{26}$O$_5$S requires C, 62,3; H, 7.2; S, 8.8 percent).

EXAMPLE 48

11α-Hydroxy-19-norpregna-4,16-diene-3,20-dione and 11α-Hydroxy-16α-methoxy-19-norpregn-4-ene-3,20-dione.

A solution of 11α,17α-dihydroxy-19-norpregn-4-ene-3,20-dione (2 g.) and semicarbazide hydrochloride (2 g.) in methanol (100 ml.) was heated under reflux for 2 hr. The methanol was evaporated under reduced pressure and water was added to the residue. The solid was collected by filtration.

A solution of this solid, pyruvic acid (2 ml.) water (14 ml.) and acetic acid (40 ml.) was heated on a steam bath for 1 hour. The solution was then concentrated by evaporation under reduced pressure and partitioned between ethyl acetate and aqueous sodium hydrogen carbonate.

The organic layer was washed with water, dried (MgSO$_4$) and evaporated under reduced pressure. The residue (1.7 g.) was separated by preparative thin-layer, chromatography into two fractions. Crystallization of the less polar fraction (0.944 g.) from acetone/petroeeum ether (b.p. 60°–80°) gave 11α-Hydroxy-19-norpregna-4,16-diene-3,20-dione (0.57 g., 30 percent), m.p. 149°–151°, / α /$_D$ + 21.9° (c 0.8 CHCl$_3$), λ$_{max}$. (EtOH) 238–9 nm. (ε 26,200). (Found: C, 76.1; H, 8.3. C$_{20}$H$_{26}$O$_3$ requires C, 76.4; H, 8.3 percent).

Crystallization of the more polar fraction (0.19 g.) from acetone/petroleum ether (b.p. 60°–80°) afforded 11α-Hydroxy-16α-methoxy-19-norpregn-4-ene-3,20-dione (0.064 g., 3 percent), m.p. 172°–176°, [α]$_D$− 8.45° (c 0.6, CHCl$_3$), λ$_{max}$. (EtOH) 239 nm (ε 15,750), (Found: C, 72.95; H, 8.6. C$_{21}$H$_{30}$O$_4$ requires C, 72.8; H, 8.7 percent).

EXAMPLE 49

11α-Hydroxy-1'-pyrazolino-(4',3':16α,17α-)-19-norpregn-4-ene-3,20-dione

A solution of diazomethane in ether prepared from nitrosomethylurea (1.3 g.), 40 percent potassium hydroxide solution (4 ml.) and ether (14 ml.) was added to a solution of 11α-hydroxy-19-norpregna-4,16-diene-3,20-dione (0.63 g.) in methylene chloride (8 ml.).

After 18 hr. the crystals, which had been deposited, were filtered off (0.61 g.) and recrystallized from acetone to give 11α-hydroxy-1'-pyrazolino-(4'3':16α,17α19-norpregn-4-ene-3,20-dione (0.455 g., 64 percent), m.p. 189°–191° (decomp.). [α]$_D$ + 34.3° (c 0.7 CHCl$_3$), λ$_{max}$. (EtOH) 239 nm. (ε 19,200), (Found: C, 70.5; H, 7.9; N, 8.1. C$_{21}$H$_{28}$N$_2$O$_3$ requires C, 70.8; H, 7.9; N, 7.9 percent).

EXAMPLE 50

11α-Hydroxy-16-methyl-19-norpregna-4,16-diene-3,20-dione.

A solution of 11α-Hydroxy-1'-pyrazolino-(4'3'; 16α, 17α)-19-norpregn-4-ene-3,20-dione (0.36 g.) in dimethylformamide (12 ml.) was heated under reflux for 1 hr, The solution was then concentrated by evaporation under reduced pressure, diluted with water and the solid (0.285 g.) was collected by filtration, Crystallization from acetone gave 11α-hydroxy-16-methyl-19-norpregna-4,16-diene-3,20-diene (0.218 g. 66 percent), m.p. 196°–199°, [α]$_D$ − 38.8° (c 1.0, CHCl$_3$), λ$_{max}$(EtOH) 242 nm. (ε 24,600) (Found: C, 76.6; H, 8.5. C$_{21}$H$_{28}$O$_3$ requires C, 76.8; H, 8.6 percent).

EXAMPLE 51

11β-Chloro-16-methyl-19-norpregna-4,16-diene-3,20-dione

11α-Hydroxy-16-methyl-19-norpregna-4,16-diene-3,20-dione (1 g., 0.003 mole) and anhydrous lithium chloride (1 g., 0.024 mole) in stirred dry tetrahydrofuran (18 ml.) were treated at 0° with N-(2-chloro-1,1,2-trifluore ethyl diethyl amine (1 ml. 0.006 mole). The reaction was kept at 0° for 10 min. and then partitioned between ethyl acetate and water. The residue (1.07 g.) from evaporation of the ethyl acetate layer was purified by preparative thin-layer chromatography and crystallization from acetone/petroleum ether (b.p. 60°–80°) to give 11β-chloro-16-methyl-19-norpregna-4,16-diene-3,20-dione (0.169 g. 16 percent) m.p. 139°–141°, λ$_{max}$. (EtOH) 241 nm. (ε24,300).

EXAMPLE 52

11β-Chloro-19-norpregna-4,16-diene-3,20-dione and 11β-chloro-16α-methoxy-19-norpregn-4-ene-3,20-dione.

A solution of 11β-chloro-17α-hydroxy-19-norpregn-4-ene-3,20-dione (0.8 g.) and semicarbazide hydrochloride (0.8 g.) in methanol (40 ml.) was heated under reflux for 2 hr. The solution was then concentration by evaporation under reduced pressure and diluted with water. The solid was collected by filtration. A solution of this solid, pyruvic acid (2.5 ml.) water (5 ml.) and acetic acid (16 ml.) was heated on a steam bath for 1 hr.

The reaction mixture was then concentrated by evaporation under reduced pressure and partitioned between ethyl acetate and aqueous sodium hydrogen carbonate solution. The organic layer was washed with water, dried (MgSO$_4$), and evaporated under reduced pressure. The residue (0.67 g.) was separated by preparative thin-layer chromatography into two fractions. Crystallization of the less polar fraction (0.38 g.) from methyl acetate/petroleum ether (b.p. 60°–80°) gave 11β-chloro-19-norpregna-4,16-diene-3,20-dione (0.246 g., 32 percent), m.p. 183°–184°, $[\alpha]_D$ + 219° (c 0.8 CHCl$_3$), $\lambda_{max}$. (EtOH) 237–8 nm (ε 31500), (Found: C, 71.7; H, 7.5; Cl, 10.3 C$_{20}$H$_{25}$ClO$_2$ requires C, 72.1; H, 7.6; Cl 10.6 percent).

Crystallization of the more polar fraction (0.124 g.) gave 11β-chloro-16α-methoxy-19-norpregn-4-ene-3,20-diene. (0.047 g. 6 percent), m.p. 172°–173°, $[\alpha]_D$ + 135° (c 0.8 CHCl$_3$), $\lambda_{max}$. (EtOH) 238 nm. (ε 18,350), (Found: C, 68.7; H, 8.0; Cl, 9.4. C$_{21}$H$_{29}$ClO$_3$ requires C, 69.1; H, 8.0; Cl, 9.7 percent).

EXAMPLE 53

11β-Chloro-1'-pyrazolino-(4',3':16α,17α)-19-norpregn-4-ene-3,20-dione and 11β-chloro-2'-pyrazolino-(4',5':16α,17α)-19-norpregn-4-ene-3,20-dione.

A solution of diazomethane in other prepared from nitrosomethylurea (1 g.), 40 percent potassium hydroxide solution (3 ml.) and ether (10 ml.) was added to a solution of 11β-chloro-19-norpregna-4,16-diene-3,20-dione (0.5 g. in methylene chloride (5 ml.). After 18 hr. water was added and the reaction mixture was stirred for 30 minutes. Methylene chloride was added and the organic layer was then separated, dried (MgSO$_4$), and evaporated under reduced pressure. The residue was separated by preparative thin layer chramatography into two fractions. The less polar fraction (0.38 g.) was crystallized from methyl acetate/petroleum ether (b.p. 60–80°) to give 11β-chloro-1'-pyrazolino-(4',3':16α,17α19-norpregn-4-ene-3,20-dione (0.24 g., 42 percent), m.p. 176°–177° (decomp.), $[\alpha]_D$ + 240° (c 0.8 CHCl$_3$), $\lambda_{max}$. (EtOH) 237 nm (ε 19,100) (Found C, 67.5; H, 7.2; Cl, 9.2; N, 7.8. C$_{21}$H$_{27}$ClN$_2$O$_2$ requires C, 67.3; H, 7.3; Cl, 9.5; N, 7.5 percent).

Crystallization of the more polar fraction (0.182 g,) from methyl acetate/petroleum ether (b.p. 60°–80°) gave 11β-chloro-2'-pyrazolino-(4',5' : 16α,17α)-19-norpregn-4ene-3,20-dione (0.12 g., 21 percent), m.p. 197°(decomp.), $[\alpha]_D$ + 389° (c 0.6 CHCl$_3$), $\lambda_{max}$. (EtOH) 238 nm (ε 20,700). (Found: C, 67.0; H, 7.2; Cl, 9.2; N, 7.5. C$_{21}$H$_{27}$ClN$_2$O$_2$ requires C, 67.3; H, 7.3; Cl, 9.5; N, 7.5 percent).

EXAMPLE 54

11β-Chloro-16-methyl-19-norpregna-4,16-diene-3,20-dione

11β-Chloro-1'-pyrazolino-(4',3':16α,17α)-19-norpregn-4-ene-3,20-dione (0.375 g.) was added to Nujol (3.7 ml.) at 195°. After 3 minutes at this temperature the reaction mixture was cooled and diluted with petroleum ether (b.p. 40°–60°) depositing a gum. The supernatent liquid was decanted and the residual gum (0.29 g.) was purified by preparative thin-layer chromatography and crystallization from methyl acetate/petroleum ether (b.p. 60°–80°) to give 11β-chloro-16-methyl-19-norpregna-4,16-diene-3,20-dione (0.11 g., 32 percent), m.p. 138°–140°, $[\alpha]_D$ + 157° (c 0.6, CHCl$_3$), $\lambda_{max}$. (EtOH) 240 nm. (ε 26,100), (Found: C, 72.4; H, 7.7;Cl, 10.5. C$_{21}$H$_{27}$ClO$_2$ requires C, 72.7; H, 7.85; Cl, 10.2 percent).

EXAMPLE 55

11β-Chloro-16α,17α-epoxy-16β-methyl-19-norpregn-4-ene-3,20-dione and 11β-chloro-16α,17α-epoxy-16β-methyl-4-oxa-A-homo-19-norpregn-4α-ene-3,20-dione.

A solution of peroxytrifluoroacetic acid, prepared from trifluoroacetic anhydride (0.45 ml.), 90 percent hydrogen peroxide (0.075 ml.) and methylene chloride (1.5 ml.) was added in four portions during 1 hr. with ice cooling and stirring to a mixture of 11β-chloro-16-methyl-19-norpregna-4,16-diene-3,20-dione (0.5 g.), powdered disodium hydrogen phosphate (3.5 g.) and methylene chloride (10 ml.). The cooling bath was then removed and, after a total time of 2½ hr., the reaction mixture was partitioned between methylene chloride and aqueous sodium hydrogen carbonate solution. The organic layer was washed with water, dried (MgSO$_4$) and evaporated under reduced pressure. The residue (0.55 g.) was separated into two fractions by preparative thin-layer chromatography. Crystallization of the more polar fraction (0.218 g.) from methyl acetate/petroleum ether (b.p. 60°–80°) gave 11β-chloro-16α,17α-epoxy-16β-methyl-19-norpregn-4-ene-3,20-dione(0.16 g., 30 percent), m.p. 181.5°–182° $[\alpha]_D$ + 156° (c 0.5, CHCl$_3$), $\lambda_{max}$. (EtOH) 237 n, (ε 16,800).

Crystallization of the less polar fraction (0.1 g.) from methanol gave 11β-chloro-16α,17α-epoxy-16β-methyl-4-oxa-A-homo-19-norpregn-4α-ene-3,20-dione (0.05 g., 9 percent), m.p. 174°–176°, $[\alpha]_D$ + 43.2° (c 1.0, CHCl$_3$).

EXAMPLE 56

11β-Chloro-17α-hydroxy-16-methylene-19-norpregn-4-ene-3,20-dione

A solution of hydrobromic acid in acetic acid (0.1 ml of 50 percent solution) was added to dioxan (7 ml.). This mixture (0.3 ml.) was then added to a solution of 11β-chloro-16α,17α-epoxy-16β-methyl-19-norpregn-4ene-3,20-dione (0.1 g.) in dioxan (3 ml.). After 20 minutes at room temperature the reaction mixture was partitioned between methylene chloride and aqueous sodium hydrogen carbonate solution. The organic layer was washed with water, dried (MgSO$_4$) and evaporated under reduced pressure. Crystallization of the residue (0.1 g.) from methyl acetate/ petroleum ether (b.p. 60°–80) gave 11β-chloro-17α-hydroxy-16-methylene-19-norpregn-4-ene-3,20-dione (0.077 g., 77 percent), m.p. 203°–206°, $[\alpha]_D$ + 22.3° (c 0.6 CHCl$_3$), $\lambda_{max}$. (EtOH) 238 nm, (ε 17,350).

EXAMPLE 57

17α-Acetoxy-11β-chloro-16-methylene-19-norpregn-4-ene-3,20-dione

A solution of 11β-chloro-16α17α-epoxy-16β-methyl-19-norpregn-4-ene-3,20-dione (0.18 g.), glacial acetic acid (2.5 ml.) and trifluoroacetic anhydride (0.5 ml.) was kept at 30°–40 for 4½ hr. The reaction mixture was partitioned between methylene chloride and aqueous sodium hydrogen carbonate solution. The organic layer was washed with water, dried (MgSO$_4$), and evaporated under reduced pressure. The residue (0.2 g.) was purified by preparative thin-layer chromatography to give 17α-acetoxy-11β-methylene-19-norpregn-4-ene-3,20-dione as a froth 90.09 g., 45 percent), $\lambda_{max}$. (EtOH) 237 nm (ε20,200).

EXAMPLE 58

11β-Chloro-17α-valeryloxy-19-norpregn-4-ene-3,20-dione

Antimony pentachloride (0.57 ml.) in stirred, dry, ethanol-free chloroform (3 ml.) at 0° was treated with valeryl chloride (0.58 ml.). After 45 minutes at 0° dry nitromethane (5 ml.) was added and half of the solution was discarded. To the remaining portion was added 11β-chloro-17β-hydroxy-19-norpregn-4-ene-3,20-dione (525 mg.) and the solution was stirred at 0° for 15 minutes and 20° for 45 minutes. Sodium acetate (1.1 g.) in water (3 ml.) was added and after 15 minutes stirring at room temperature the mixture was diluted with chloroform, washed with dilute aqueous sodium bicarbonate and with water, dried (Na$_2$SO$_4$), filtered and evaporated to leave a gum. Preparative thin layer chromatography afforded pure 11β-chloro-17α-valeryloxy-19-norpregn-4ene-3,20-dione (381 mg.) as a foam, $[\alpha]_D$ + 49° (Dioxan, c 1.14), $\lambda_{max}$. 237 nm (ε 17,000), (Found: C, 69.0; H, 8.0; Cl, 8.0.C$_{25}$HClO$_4$ requires 69.05; H, 8.1; Cl, 8.15 percent).

EXAMPLE 59

(a) 17α-Acetoxy-6,11β-dichloro-19-norpregna-4,6-diene-3,20-dione

A mixture of 17α-acetoxy-6,11β-dichloro-3-ethoxy-19-norpregna-3,5-diene-20-one (0.6 g.) manganese dioxide (3 g.) and benzene (15 ml.) was stirred for 1 hr. and then filtered. The filtrate was evaporated under reduced pressure and the residue (0.528 g.) was purified by preparative thin-layer chromatography and crystallization of part (0.448 g.) from methyl acetate/petroleum ether (b.p. 60°–80°) gave methylacetate solvate which was desolvated by heating at 95° for 4 hr. at 0.5 mm. to give 17α-acetoxy-6,11β-dichloro-19-norpregna-4,6-diene-3,20-dione (0.37 g., 66 percent), m.p. 211°–212° (decomp.), $[\alpha]_D + 78°$ (c 1.0 Dioxan) $\lambda_{max.}$ (EtOH) 280 nm. ($\epsilon$ 22,100). (Found: C, 62.0; H,6.2; Cl,16.5. $C_{22}H_{26}Cl_2O_4$ requires C,62.1; H,6.2; Cl 16.7)

(b) 6,11β-Dichloro-17α-hydroxy-19-norpregna-4,6-diene-3,20-dione.

17α-Acetoxy-6,11β-dichloro-19-norpregna-4,6-diene-3,20-dione methyl acetate solvate (104 mg.) in methanol (5 ml.) and water (0.1 ml.) was treated with potassium bicarbonate (22 mg.) and the solution was refluxed for 2 hours in a stream of nitrogen. The solution was diluted with ether, washed with dilute aqueous hydrochloric acid and with water, dried (MgSO$_4$), filtered and evaporated to a foam which on recrystallization from aqueous methanol afforded 6,11β-dichloro-17α-hydroxy-19-norpregna-4,6-diene-3,20-dione (34 mg.) as prisms, m.p. 215°–218° $\lambda_{max}$ 280.5 nm ($\epsilon$ 22,100).

EXAMPLE 60

17α-Acetoxy-11β-chloro-19-norpregn-4-ene-3,20-dione

Antimony pentachloride (1.14 ml.) in dry ethanol-free chloroform (6 ml.) was treated at 0° with acetyl chloride (0.7 ml.). The solution was stirred at 0° for 45 minutes before dry nitromethane (10 ml.) was added, followed by 11β-chloro-17α-hydroxy-19-norpregn-4-ene-3,20-dione (2.0 g.). The solution was stirred for 15 minutes at 0° and for 45 minutes at 20° before sodium acetate (4.4 g.) in water (12 ml.) was added. After stirring for a further 15 minutes at room temperature the mixture was diluted with chloroform, washed with dilute aqueous sodium bicarbonate and with water, dried (Na$_2$SO$_4$) and evaporated to leave a foam. This was crystallized from hot methanol to afford 17α-acetoxy-11β-chloro-19-norpregn-4-ene-3,20-dione (1.27 g.) as needles, m.p. 198°–202°, $[\alpha]_D$ + 62° (Dioxan, c 0.63). Preparative thin layer chromatography of the mother liquors afforded a further quantity. (554 mg.) of the above 17α-acetate.

EXAMPLE 61

11β-Chloro-17α-propionyloxy-19-norpregn-4-ene-3,20-dione

Antimony pentachloride (0.57 ml.) in dry, ethanol-free chloroform (3 ml.) at 0° was stirred and propionyl chloride (0.4 ml.) was added. The mixture was stirred at 0° for 45 minutes, dry nitromethane (5 ml.) was added and half of the yellow solution was discarded. To the remainder was added 11β-chloro-17α-hydroxy-19-norpregn-4-ene-3,20-dione (525 mg.) and the solution formed was stirred at 0° for 15 minutes and 20° for 45 minutes. Sodium acetate (1.2 g.) in water (3 ml.) was added and after stirring for 15 minutes at room temperature the mixture was diluted with chloroform, washed with dilute aqueous sodium bicarbonate and with water, dried (MgSO$_4$) filtered and evaporated under reduced pressure to leave a foam which was subjected to preparative thin layer chromatography. The main component from the chromatography was crystallized from ether/hexane to afford 11β-chloro-17α-propionyloxy-19-norpregn-4-ene-3, 20-dione (230 mg.) as colorless prisms, m.p. 140°–142°, $[\alpha]_D$+ 58° (Dioxan, c 0.96), $\lambda_{max.}$237 nm. ($\epsilon$ 17,700).

EXAMPLE 62

17α-Acetoxy-11β-chloro-16-methylene-19-norpregn-4-ene-3,20-dione

A solution of 11β-chloro-17α-hydroxy-16-methylene-19-norpregn-4-ene-3,20-dione (0.363 g.) and p-toluene sulphonic acid (0.363 g.) in glacial acetic acid (16 ml.) and acetic anhydride (8 ml.) was allowed to stand at room temperature for 17 hours. The reaction mixture was then poured into water and stirred until the excess of acetic anhydride had been hydrolyzed. The product was isolated by extraction with methylene chloride and purified by preparative thin layer chromatography to give 17α-acetoxy-11β-chloro-16-methylene 19-norpreg-4-ene-3,20-dione with an R$_f$ value on thin layer chromatography identical with that of the product of Example 57 and Example 78.

EXAMPLE 63

11α-Formyloxy-16 2,17α-methylene-19-norpregn-4-ene-3,20-dione

11α-Hydroxy-1'-pyrazolino-(4',3':16α17α)-19-norpregn-4-ene-3,20-dione (0.18g., 0.5 mmoles) was added to formic acid (1.8 ml) at 95°. Heating was continued for 10 minutes. The reaction mixture was then partitioned between chloroform and aqueous sodium hydrogen carbonate solution.

The organic layer was washed with water and evaporated under reduced pressure. The residue (0.22 g.) was purified by preparative layer chromatography and crystallization from acetone/petroleum ether (b.p. 60°–80°) to give the title compound (42 mg., 23 percent), m.p. 180°–184°, $[\alpha]_D$+ 67° (c 0.5), $\lambda_{max.}$237 nm ($\epsilon$ 18,200).

EXAMPLE 64

11α-Hydroxy-16α,17α-methylene-19-norpregn-4-ene-3,20-dione

11α-Formyloxy-16α,17α-methylene-19-norpregn-4-ene-3,20-dione (330 mg, 0.93 m.moles) in methanol (10 ml) was treated with potassium bicarbonate (100 mg). The mixture was heated to 50° for 2 hr. The reaction mixture was then poured into water, extracted with chloroform, washed with aqueous sodium bicarbonate and water, and dried (MgSO$_4$). The residue (360 mg), after evaporation, was crystallized from methyl acetate/petroleum ether (b.p. 60–80°) to yield the title compound (229mg, 75 percent). Recrystallation from methyl acetate/petroleum ether (b.p. 60°–80°) gave 210 mg. (69 percent) m.p. 151°–154°, $[\alpha]_D$ + 49°, $\lambda_{max.}$239 nm ($\epsilon$ 17,100).

EXAMPLE 65

11α-Chloro-16α, 17α-methylene-19-norpregn-4-ene-3,20-dione

11β-chloro-1'-pyrazolino-(4',3':16α,17α)-19-norpregn-4-ene-3,20-dione (1.18g, 0.003 mole) was added to formic acid (12 ml) at 95°. Nitrogen was evolved immediately. The solution was heated for a further 10 mins and then extracted with chloroform, washed with aqueous sodium bicarbonate and water, then dried (MgSO$_4$). The residue (1.9g), after evaporation, was purified by preparative thin layer chromatography and crystallization from acetone/petroleum ether (b.p. 60°–80°) to afford the title compound (0.26 g. 24 percent) m.p. 156°–159°, $[\alpha]_D$+222°, $\lambda_{max}$ 238nm ($\epsilon$ 18,300).

EXAMPLE 66

11β-Chloro-16α,17α-methylene-19-norpregn-4-ene-3,20-dione

11α-Hydroxy-16α,17α-methylene-19-norpregn-4-ene-3,20-dione (90 mg. 0.27 m.mole) and anhydrous lithium chloride (90 mg, 2m.mole) in stirred dry tetrahydrofuran (1.8 ml) were treated at 0° with N-(2-chloro-1,1,2-trifluoroethyl)-diethylamine (0.09 ml, 0.55 m.mole). The reaction was kept at 0° for 4 hr. then poured into ice-water (20 ml). The mixture was extracted with methylene-chloride washed with water and dried (MgSO$_4$). The residue (0.2g), after evaporation, was purified by preparative thin layer chromatography and crystallization from acetone/petroleum ether (b.p.60°–80°) to give the title compound (17 mg, 18 percent), m.p. 156°–158°.

EXAMPLE 67

11β-Chloro-16-methylene-17α-propionyloxy-19-norpregn-4-ene-3,20-dione

Trifluoroacetic anhydride (0.5 ml) was added to a suspension of 11β-Chloro-17α-hydroxy-16-methylene-19-norpregn-4-ene-3,20-dione (0.25 g.) in propionic acid (2.5 ml) at 80° under nitrogen. The reaction mixture was maintained at 80° for 2 hr and then cooled and partitioned between water and ether. The organic layer was washed with aqueous sodium hydrogen carbonate solution and then water. It was dried (MgSO$_4$) and evaporated under reduced pressure. The residue (0.295g) was purified by preparative thin-layer chromatography to give the title compound (0.2 g., 70 percent) $[\alpha]_D$ − 41.9° ($c$ 0.6), $\lambda_{max}$ 236 nm ($\epsilon$ 18,300).

EXAMPLE 68

11β-Chloro-17α-hydroxy-16-methylene-4-oxa-A-homo-19-norpregn-4a-ene-3,20-dione

A solution of 11β-chloro-16α,17α-epoxy-16β-methyl-4-oxa-A-homo-19-norpregn-4a-ene-3,20-dione (0.15g) in dry dioxan (4.5 ml) was treated with a hydrogen bromide solution (0.45 ml) prepared from hydrobromic acid in acetic acid (0.1 ml. of 50 percent solution) in dioxan (7 ml).

After ½ hr. at room temperature the reaction mixture was partitioned between methylene chloride and aqueous sodium hydrogen carbonate. The organic layer was washed with water, dried (MgSO$_4$) and evaporated under reduced pressure. The residue was purified by preparative thin-layer chromatography and crystallization from ether to give the title compound (0.06g., 40 percent) m.p. 181°–187°, $[\alpha]_D$ −44.7° ($c$, 0.7).

EXAMPLE 69

17α-Acetoxy-11β-chloro-16-methylene-4-oxa-A-homo-19-norpregn-4a-ene-3,20-dione

11β-Chloro-17α-hydroxy-16-methylene-4-oxa-A-homo-19-norpregn-4a-ene-3,20-dione (0.3g) in acetic acid at 80° under nitrogen was treated with trifluoroacetic anhydride (0.6 ml). The reaction mixture was heated at 80° for 2½ hr. It was then cooled and partitioned between water and ether. The organic layer was washed with water, dried (MgSO$_4$) and evaporated under reduced pressure. The residue (0.33 g.) was purified by preparative thin-layer chromatography and crystallization from methyl acetate/petroleum ether (b.p. 60°–80°) to give the title compound (0.09 g, 27 percent). m.p. 204°–205°, $[\alpha]_D$ −92.5° ($c$, 0.6). D

EXAMPLE 70

3,17α-Diacetoxy-11β-chloro-16-methylene-19-norpregna-3,5-dien-20-one

11β-Chloro-17α-hydroxy-16-methylene-19-norpregn-4-ene-3,20-dione (0.363g, 0.001 mole) in refluxing dry benzene (20ml) was treated under a stream of dry nitrogen with isopropenyl acetate (3 ml, 0.027 mole) and p-toluene sulphonic acid (0.02g). The solution was refluxed with slow distillation for 7 hrs; benzene/isopropenyl acetate (10:1) being added to maintain constant volume. A further quantity of p-toluene sulphonic acid (20 mg) was added after 3 hrs. When the reaction had reached completion, pyridine (0.3 ml) was added and the reaction mixture was partitioned between benzene and water. The organic layer was dried (MgSO$_4$) and the residue, after evaporation, was purified by preparative layer chromatography and crystallization from methyl acetate to afford the title compound (191 mg, 43 percent), m.p. 220°–224°, $[\alpha]_D$ − 164° ($c$ 0.5), $\lambda_{max}$ 234 nm ($\epsilon$ 19,100).

EXAMPLE 71

17α-Acetoxy-6β,11β-dichloro-16-methylene-19-norpregn-4-ene-3,20-dione 3,17α-Diacetoxy-11β-chloro-16-methylene-19-norpregna-3,5-dien-20-one (1.1g, 2.4 mmole) in dry, ethanol-free chloroform (22 ml), dry triethylamine (4.5 ml) and dry glacial acetic acid (6.6ml) at 0° was treated with chlorine in dry carbon tetrachloride (22.5 ml of 0.219 Molar). The solution was stirred at 0° for 1 hr, then poured into ether, washed with water (×3), dried (MgSO$_4$) filtered and evaporated. The residue (1.5g) was taken up in glacial acetic acid (25 ml) and heated under nitrogen on a steambath for 30 minutes. The acetic acid was removed at reduced pressure to yield crude 17α-acetoxy-6β, 11β-dichloro-16-methylene-19-norpregn-4-ene-3,20-dione (1g).

EXAMPLE 72

17α-Acetoxy-6,11β-dichloro-3-ethoxy-16-methylene-19-norpregna-3,5-dien-20-one

Crude 17α-acetoxy-6β,11β-dichloro-16-methylene-19-norpregn-4-ene-3,20-dione (338 mg, 0.77 mmole) and triethylorthoformate (2.5 ml) in dry dioxan (6.3ml) were treated with sulphosalicylic acid (32 mg) under nitrogen at room temperature. After 2 hr a further quantity of sulphosalicylic acid (10mgs) was added. After a further hour, pyridine (6 drops) was added and the reaction mixture was partitioned between ether and water. The ether layer was washed with water (×2), dried (Na$_2$SO$_4$) and evaporated. The residue (380mgs) was purified by preparative layer chromatography and crystallization from methyl acetate/petroleum ether (b.p. 60°–80) containing a drop of pyridine, to afford the title compound (70mg, 19 percent) m.p. 158°–159° (decomp) $[\alpha]_D$ − 164° ($c$ 0.5), $\lambda_{max}$ 251 nm ($\epsilon$ 19,400).

EXAMPLE 73

17α-Acetoxy-6,11β-dichloro-16-methylene-19-norpregna-4,6-diene-3,20-dione

17α-Acetoxy-6,11β-dichloro-3-ethoxy-16-methylene-19-norpregna-3,5-dien-20-one (0.555g, 1.19 mmole) and manganese dioxide (2.7g) were stirred together at room temperature and acetic acid (20 ml.) containing water (2ml.) was added. After 15 minutes the solution was filtered through Kieselguhr. The manganese dioxide was washed with acetone and the combined washings and filtrate were evaporated under reduced pressure. The residue was purified by preparative thin-layer chromatography and crystallization from methyl acetate/petroleum ether (b.p. 60°–80°) to afford the title compound (0.222g, 43 percent), m.p. 197°–199° (decomp), $[\alpha]_D$ − 51° ($c$ 0.5) $\lambda_{max}$ 279 nm ($\epsilon$ 22,900).

EXAMPLE 74

6,11β-Dichloro-19-norpregna-4,6,16-triene-3,20-dione and 6,11β-dichloro-c16α-methoxy-19-norpregna-4,6-diene-3,20-dione A solution of 6,11β-dichloro-17α-hydroxy-19-norpregna-4,6-diene-3,20-dione (0.38g., 1 mmole; prepared by the process of Example 28 of our said Patent specification followed by hydrolysis of the 17α-acetoxy group with potassium bicarbonate in methanol) and semicarbazide hydrochloride (0.38g) in methanol (20 ml) was heated under reflux for 2 hr. The solution was then concentrated under reduced pressure and diluted with water. The solid was collected by filtration. A solution of this solid, pyruvic acid (0.4ml), water (2 ml.) and acetic acid (7ml) was heated on a steam bath for 1 hr. The reaction mixture was then concentrated by evaporation under reduced pressure and partitioned between ethyl acetate and sodium hydrogen carbonate solution. The organic layer was washed with water, dried (MgSO$_4$) and evaporated under reduced pressure. The residue (0.35g) was separated by preparative thin-layer chromatography into two fractions. Crystallization of the less polar fractions (0.15 g) from methyl acetate/petroleum ether (b.p. 60°–80°) gave 6,11β -dichloro-19-norpregna-4,6,16-triene-3,20-dione (0.12g., 33 percent), m.p. 158°–160°, $[\alpha]_D$ + 270° ($c$, 0.5), $\lambda_{max}$ 238, 280 nm ($\epsilon$ 13,700, 23, 500).

From another preparation on a 7 g. scale crystallization of the more polar fraction (0.49g) from methyl acetate gave 6,11β-dichloro-16α-methoxy-19-norpregna-4,6-diene-3,20-dione (0.365 g., 5 percent) m.p. 160°–162° (decomp) [α]$_D$ + 150°, λ$_{max}$ 280 nm (ε 22,800), (Found: C, 63.2; H, 6.6; Cl 17.7; $C_{21}H_{26}Cl_2O_3$ requires C, 63.5; H, 6.6; Cl. 17.8 percent.

EXAMPLE 75

6,11β-Dichloro-1'-pyrazolino-(4',3':16α17α)-19-norpregna-4,6-diene-3,20-dione

A solution of diazomethane in ether prepared from nitrosomethylurea (0.5 g) was added to a solution of 6,11β-dichloro-19-norpregna-4,6,16-triene-3,20-dione (0.25g) in methylene chloride solution (2.5 ml). After 18 hr the crystals which had deposited were filtered off to give the title compound (0.227g, 82 percent), m.p. 169°–170° (decomp). [α]$_D$ +241° (c, 0.8). λ$_{max}$ 278 nm (ε 11.300).

EXAMPLE 76

6,11β-Dichloro-16α, 17α-methylene-19-norpregna-4,6-diene-3,20-dione 6,11β-Dichloro-1'-pyrazolino-(4',3'; 16α,17α)-19-norpregna-4,6-diene-3,20-dione (0.407g) was added to formic acid (4 ml) at 100°. The reaction mixture was heated on the steam bath for 15 minutes and it was then concentrated in vacuo. The residue was partitioned between aqueous sodium hydrogen carbonate solution and methylene chloride. The organic layer was washed with water, dried (MgSO$_4$) and evaporated under reduced pressure. The residue (0.39 g) was purified by preparative thin-layer chromatography and crystallization from methyl acetate/petroleum ether (b.p. 60°–80) to give the title compound (0.172g, 45 percent) m.p. 202°–204° [α]$_D$+265° (c,0.8)λ$_{max}$ 280 nm (ε 22,700).

EXAMPLE 77

6,11β-Dichloro-2'-pyrazolino-(4',5':16α,17α)-19-norpregna-4,6-diene-3,20-dione 6,11β-Dichloro-1'-pyrazolino-(4',3':16α,17α)-19-norpregna-4,6-diene-3,20-dione (0.25g) in methanol (40ml) containing concentrated hydrochloric acid (0.025ml) was boiled for 5 minutes and then allowed to stand at room temperature for 1 hour. The reaction mixture was then concentrated in vacuo and the residue was partitioned between methylene chloride and aqueous sodium hydrogen carbonate solution. The organic layer was washed with water, dried (MgSO$_4$) and evaporated under reduced pressure. The residue (0.215g.) was purified by preparative thin-layer chromatography and crystallization from methanol to give the title compound (0.077g., 31 percent), m.p. 192° (decomp), [α]$_D$ + 386° (c 0.5), λ$_{max}$ 280 nm. (ε 23,800).

EXAMPLES 78

17α-Acetoxy-11β-chloro-16-methylene-19-norpregn-4-ene-3,20-dione

Trifluoroacetic anhydride (0.6 ml) was added to a suspension of 11β-chloro-17α-hydroxy-16-methylene-19-norpregna-4-ene-3,20-dione (0.3 g.) in acetic acid (3 ml) at 60° under nitrogen. The mixture was heated at 80° for 1½ hr and then partitioned between ether and aqueous sodium hydrogen carbonate solution. The organic layer was washed with water, dried (MgSO$_4$) and evaporated to dryness under reduced pressure. The residue (0.353g) was purified by preparative thin-layer chromatography and crystallization from ether to give the title compound (0.176g., 53 percent), m.p. 160°–162°, [α]$_D$− 39.8° (c, 0.5) λ max 237 nm (ε 19,200). The following Examples illustrate pharmaceutical compositions according to the invention:

A. Oral tablets (continuous daily administration)
(a) 17α - acetoxy - 6, 11β - dichloro - 19 nor pregn - 4, 6 -diene - 3, 20 dione.
(microfine) 0.25 mg
Starch (60 mesh) 10.0 mg
Lactose (60 mesh) 64.0 mg
Magnesium stearate (100 mesh.) 0.75 mg Ball mill (a) with twice the weight of lactose to a very fine powder all below 5 microns. Dilute with 5 successive portions of lactose, milling between each. Triturate with the starch and blend in the remaining lactose to form a homogeneous powder. Granulate with 50 percent ethanol in water and pass through a No. 12 mesh B.S. sieve. Dry the granules to constant weight and pass through a No. 20 mesh B.S. sieve and blend in the magnesium stearate prior to compression at 75 mg. per tablet on 7/32 inch punches, preferably engraved punches for identification of the tablets. Pressure is adjusted so that the tablets disintegrate within 10 mins. The tablets may be film coated for color distinction and should be released for public use, only in specially designed packs to strictly regulate the use of the tablets.

B. Oral tablets (for intermittent administration)
(b) 17α - acetoxy - 11β - chloro - 19 nor - pregn - 4 - ene - 3, 20 dione (microfine) 2.0 mg
(c) Ethynyl oestradiol (microfine.) 0.05 mg
Starch (60 mesh) 10.5 mg
Lactose (60 mesh) 66.65 mg
Magnesium stearate (100 mesh) 0.8 mg Ball mill (b) and (c) separately with very small quantities of lactose, mix together and proceed as in example 1, treating the mixture of (b) and (c) as for (a) in example 1. The tablets will of course be compressed on different punches at 80 mg per tablet, and may be subsequently coated if required.

C. Long Acting Injection (Deep intra muscular)
(d) 17α — acetoxy — 6, 11β — dichloro — 19 nor pregna — 4, 6 — diene — 3, 20 dione. (Sterile) 10.0 mg
Aluminum stearate 1.5 percent w/w gelled in winterized arachis oil to produce 0.5 ml.

Prepare the base by heating together the aluminum stearate dispersed in the arachis oil until solution is effected and thickening occurs about 90° C. Close the vessel and with continued stirring, sterilize the base by heating at 150° C for one hour. Cool rapidly to 55° C. Aseptically triturate the (d) with the base and pass through a refining mill and pemix to obtain a homogeneous dispersion. Pack into unit cartridges.

D. Aqueous Injection (long acting.)
(e) 17α - acetoxy - 11β - chloro - 19 nor - pregn - 4 - ene - 3, 20 dione 10.0 mg
(f) Sodium carboxy - methyl - cellulose 10 mg
(g) Nonex, 52 (a polyethylene glycol oleate supplied by Union Carbide of Grafton St., London W.l.) 0.01% w/v (in final injection)
(h) Formalized starch 20 mg
Vehicle (in separate container)
A sterile sorbitol solution 10% w/w 1 ml Sterile (f) and (h) separately by dry heat. Dissolve (g) in a little chloroform, sterilize by filtration and disperse over the mixed, sterilized powders (f) and (h). Remove the chloroform and blend the powders in a ball mill to give a homogeneous mix.

Prepare sterile crystals of (e) in 2 particle size ranges, approximately, 15–25 microns and 30–40 microns, taking about equal portions of each. Blend these crystals with the base and aseptically distribute 55 mgs of the resultant dry mix into sterile vials and close hermetically. Reconstitute the injection immediately before use, by adding 1 ml of the sorbitol vehicle to the dry mix and shaking to obtain a suspension.

E. Tablet Implant
(j) 17α - acetoxy - 11β - chloro - 19 nor - pregn - 4 - ene - 3,20 dione (microfine) 60 mg Tablets implants may be prepared by conventional methods such as heavy compression of the pure sterile material or by fusion, by melting and casting into shape in a mould. The implants are packed into sterile moisture proof containers.

The quantity of active ingredient in an implant will be related to the duration required; shape and surface area and average absorption required from the formulation.

F. Intravaginal pessary for veterinary use. (For sheep)
 (k) 17β - acetoxy - 6, 11β - dichloro - 19 nor pregna- 4, 6 - diene - 3, 20 dione.    20.0 mgs.

Dissolve (k) in sufficient ethanol and sterilize by filtration. The pessaries or tampons may be prepared in a conventional manner by absorbing the required amount of ethanolic solution onto sterile gauze rolls or fine porous plastic sponges, evaporating the ethanol under vacuum and protecting the vaginal insert in a sterile pack, suitable for administration. The dosage required for veterinary preparations, will, of course, be related to the size of the animal being treated.

G. Oral tablets were prepared as in Example A, the steroid being replaced by 0.10 mg. of 17α-acetoxy-6,11β-dichloro-16-methylene-19-norpregna-4,6-diene-3,20-dione, the lactose content being increased to 64.15 mg.

H. Oral tablets for intermittent administration were prepared as in Example B, the steroid (b) being replaced by 0.5 mg. of 17α-acetoxy-11β-chloro-16-methylene-19-norpregn-4-ene-3,20-dione, the lactose content being increased to 67.15 mg.

I. A long acting aqueous injection was prepared as in Example D, the steroid (e) being replaced by 3,17α-diacetoxy-11β-chloro-16-methylene-19-norpgegna-3,5-dien-20-one.

J. A tablet inplant was prepared as in Example E, the steroid (j) being replaced by 30 mg. of 17α-acetoxy-11β-chloro-16-methylene-19-norpregn-4-ene-3,20-dione.

We claim:

1. A 9α-unsubstituted-11β-chloro-19-nor-steroid of the androstane or pregnane series.

2. Steroids as claimed in claim 1 having one or more substituents selected from the group consisting of a hydroxyl group, a protected hydroxyl group, an oxo group, or a protected oxo group, or an aliphatic, araliphatic, acyl or acyloxyacyl group in the presence or absence of a hydroxyl or protected hydroxyl group in the 17-position; a hydrogen, chlorine or fluorine atom or a methyl group in the 6-position; an oxo, protected oxo, hydroxyl or protected hydroxyl group in the 3-position, an epoxy or methylene group joining the 16- and 17-positions; a 2'pyrazolino-(4',3':16α,17α)-grouping or a 2'-pyrazolino (4',5':16α,17α)-grouping fused onto the 16-and 17-positions.

3. Steroids as claimed in claim 1 having a methyl, methylene or methoxy group in the 16-position.

4. Steroids as claimed in claim 1 having one or more double bonds in the A and/or B rings and/or a double bond in the 16, 17-position.

5. Seroids as claimed in claim 1 having a 3-oxo group and a 4,5-double bond or double bonds in both the 4,5- and 6,7-positions or a 3-acyloxy or 3-ether group and double bonds in the 3,4- and 5,6-positions.

6. Steroids as claimed in claim 4 having a 17-oxo substituent or a 17β-acyloxy or a 17β-hydroxy group together with a 17α-hyrogen atom or 17α-saturated hydrocarbon group having one to nine carbon atoms.

7. Steroids as claimed in claim 1 having a 17β-hydroxy or acyloxy group together with a 17α -unsaturated aliphatic group with one to nine carbon atoms or a 17α -hydroxy atom or 17 -hydroxy or acyloxy group together with a 17β-acyl group.

8. Steroids as claimed in claim 1 having a chlorine atom in the 6-position.

9. Steroids as claimed in claim 1 in which any acyloxy groups present are aliphatic, araliphatic, cycloaliphatic or arylacyloxy groups.

10. Steroids as claimed in claim 9 in which said acyloxy groups acetoxy, propionyloxy or valeryloxy groups.

11. Steroids as claimed in claim 2 in which said protected hydroxyl groups are alkoxy groups having one to five carbon atoms, aralkoxy groups or aryloxy groups and said protected oxo groups are ketal or enol ether groups.

12. Steroids as claimed in claim 11 in which said protected hydroxyl groups are methoxy or benzyloxy groups and said protected oxo groups are ethylene dioxy or enol methyl ether or enol ethyl ether groups.

13. Steroids as claimed in claim 7 possessing at the 17α position a vinyl, allyl, ethynyl or chloroethynyl group or a 17β-acetyl group.

14. Steroids as claimed in claim 7 possessing at the 17α position a 2-methyl-prop-2-enyl, 1-methyl-prop-2-enyl, or but-2-enyl group.

15. A 4,9,16-unsubstituted-11β-chloro-19-nor-steroid of the androstane or pregnane series.

16. A process for the preparation of chlorine-substituted steroids of the androstane or pregnane series in which a steroid primary or secondary alcohol of said series is reacted with a compound of general formula

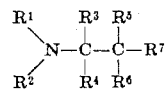

where $R^1$ and $R^2$, which may be the same or different, are alkyl groups having one to five carbon atoms or aralkyl or aryl groups, or, together with the nitrogen atom to which they are attached, comprise a heterocyclic radical which may, if desired, contain further hetero-atoms,
 $R^3$ is a fluorine atom,
 $R^4$ is a fluorine atom, and
 $R^5$ is hydrogen or $R^4$ and $R^5$ together represent a carbon-carbon bond;
 $R^6$ is a chlorine or fluorine atom and
 $R^7$ is a chlorine or fluorine atom or a trifluoromethyl group, the reaction being effected in the presence of chloride ions.

17. The steroid of claim 1 which is 11β-chloro-17α-ethynyl-17β-hydroxyoestr-4-en-3-one.

18. The steroid of claim 1 which is 11β-chloro-17α-ethynyl-17β-hydroxy-3-methoxyoestra-3,5-diene.

19. The steroid of claim 1 which is 6α,11β-dichloro-17α-ethynyl-17β-hydroxyoestr-4-en-3-one.

20. The steroid of claim 1 which is 17α-acetoxy-6,11β-dichloro-19-norpregna-4,6-diene-3,20-dione.

21. The steroid of claim 1 which is 17α-acetoxy-11β-chloro-19-norpregn-4-ene-3,20-dione.

22. The steroid of claim 1 which is 6,11β-dichloro-17α-ethynyl-17β-hydroxyoestra-4,6-dien-3-one.

23. The steroid of claim 1 which is 11β-chloro-19-norpregn-4-ene-3,20-dione.

24. The steroid of claim 1 which is 11β-chloro-17α-propionyloxy-19-norpregn-4-ene-3,20-dione.

25. The steroid of claim 1 which is 11β-chloro-17β-hydroxy-17α-(2-methylprop-2-enyl) oestr-4-en-3-one.

26. The steroid of claim 1 which is 11β-chloro-17α-chloroethynyl-17β-hydroxyoestr-4-en-3-one.

27. The steroid of claim 1 which is 11β-chloro-16α methoxy-19-norpregn-4-ene-3,20-dione.

28. The steroid of claim 1 which is 17α-acetoxy-11β-chloro-16-methylene-19-norpregn-4-ene-3,20-dione.

29. The steroid of claim 1 which is 11β-chloro-16α, 17α-methylene-19-norpregn-4-ene-3,20-dione.

30. The steroid of claim 1 which is 6,11β-dichloro-16α,17α-methylene-19-norpregna-4,6-diene-3,20-dione.

31. The steroid of claim 1 which is 11β-chloro-16-methylene-17α-propionyloxy-19-norpregn-4-ene-3,20-dione.

32. The steroid of claim 1 which is 17α-acetoxy-6,11β-dichloro-16-methylene-19-norpregna-4,6-diene-3,20-dione.

33. The steroid of claim 1 which is 3,17α-diacetoxy-11β-chloro-16-methylene-19-norpregna-3,5-dien-20-one.

34. The steroid of claim 1 which is 17α-acetoxy-6α,11β-dichloro-19-norpregn-4-ene-3,20-dione.

* * * * *

PO-1050
(5/69)

UNITED STATES PATENT OFFICE
CERTIFICATE OF CORRECTION

Patent No. 3,665,021          Dated May 23, 1972

Inventor(s) Joseph Elks, Gordon Hanley Phillipps, Allan Tulley

It is certified that error appears in the above-identified patent and that said Letters Patent are hereby corrected as shown below:

The title should read "9α-Unsubstituted-11β-Chloro-19-Nor-Steroids".

Column 1, line 17, "the ,6-position" should read -- the·16-position --.

Column 3, formula II, that portion of the formula reading $$RO-\!\!\!-\!\!\!-\!\!\!\diagup_{\big|}$$

should read $$RO-\!\!\!\!\diagup_{\big|}$$

Column 35, line 61, after "atoms" insert -- ; --;

"17α-hydroxy" should read -- 17α-hydrogen --;

line 62, "17 hydroxy" should read -- 17α-hydroxy --.

Signed and sealed this 2nd day of January 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,665,021                    Dated May 23, 1972

Inventor(s)   Joseph Elks et al.

It is certified that error appears in the above-identified patent and that said Letters Patent are hereby corrected as shown below:

The heading should include -- Claims priority of British applications of 34275/66 July 27, 1966, 23066/67 May 18, 1967 and 4570/68 January 23, 1969 --.

The Related U. S. Application Data, and column 1, line 2 should include -- which is a continuation-in-part of Serial No. 656,665 filed July 28, 1967 --.

Signed and sealed this 8th day of October 1974.

(SEAL)
Attest:

McCOY M. GIBSON JR.                     C. MARSHALL DANN
Attesting Officer                       Commissioner of Patents

UNITED STATES PATENT OFFICE
CERTIFICATE OF CORRECTION

Patent No. 3,665,021　　　　　　　　　Dated May 23, 1972

Inventor(s) Joseph Elks et al.

It is certified that error appears in the above-identified patent and that said Letters Patent are hereby corrected as shown below:

The heading should include -- Claims priority of British applications of 34275/66 July 29, 1966, 23066/67 May 18, 1967 and 4570/68 January 23, 1969 --.

The Related U. S. Application Data, and column 1, line 2 should include -- which is a continuation-in-part of Serial No. 656,665 filed July 28, 1967 --.

This certificate supersedes Certificate of Correction issued Oct. 8, 1974.

Signed and sealed this 24th day of June 1975.

(SEAL)
Attest:

RUTH C. MASON
Attesting Officer

C. MARSHALL DANN
Commissioner of Patents
and Trademarks

FORM PO-1050 (10-69)